United States Patent
Zhou et al.

(10) Patent No.: US 11,770,093 B2
(45) Date of Patent: *Sep. 26, 2023

(54) AC CHOPPING CIRCUIT AND ASSOCIATED SINGLE-PHASE AC MOTOR DRIVING SYSTEM

(71) Applicant: Xiamen Kiwi Instruments Corporation, Xiamen (CN)

(72) Inventors: Zongjie Zhou, Xiamen (CN); Huijie Yu, Xiamen (CN); Kunming Cai, Xiamen (CN)

(73) Assignee: Xiamen Kiwi Instruments Corporation, Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,982

(22) Filed: Aug. 11, 2022

(65) Prior Publication Data

US 2023/0048479 A1  Feb. 16, 2023

Related U.S. Application Data

(63) Continuation of application No. 17/404,887, filed on Aug. 17, 2021, now Pat. No. 11,437,947.

(30) Foreign Application Priority Data

Aug. 18, 2020 (CN) .......................... 202010830878.3
Oct. 16, 2020 (CN) .......................... 202011109622.X

(51) Int. Cl.
*H02P 25/04* (2006.01)
*H02P 6/26* (2016.01)
*H02P 29/024* (2016.01)

(52) U.S. Cl.
CPC ............ *H02P 29/027* (2013.01); *H02P 25/04* (2013.01); *H02P 2207/01* (2013.01)

(58) Field of Classification Search
CPC .... H02P 2207/01; H02P 25/04; H02P 29/027; H02P 6/26
See application file for complete search history.

(56) References Cited

U.S. PATENT DOCUMENTS

| 8,193,744 B2 * | 6/2012 | Steiner ...................... H02P 1/24 |
| | | 318/245 |
| 10,439,542 B2 * | 10/2019 | Taniguchi ........... H02M 7/5395 |
| 10,756,662 B2 * | 8/2020 | Steiner .................... H02P 27/16 |
| 10,972,038 B2 * | 4/2021 | Yu ........................... H02P 25/04 |
| 2011/0062933 A1 * | 3/2011 | Tosuntikool ........ H02M 5/2573 |
| | | 200/19.01 |
| 2019/0013758 A1 * | 1/2019 | Steiner ................... H05B 47/16 |

* cited by examiner

*Primary Examiner* — Thai T Dinh
(74) *Attorney, Agent, or Firm* — Faegre Drinker Biddle & Reath

(57) ABSTRACT

According to some embodiments, AC chopping circuit includes a switching circuit, a synchronizing signal generating circuit, a switch driving circuit and an auxiliary power supplying circuit. In some examples, the switching circuit is coupled to an AC power source and a load. In certain examples, the synchronizing signal generating circuit provides a synchronizing signal which is related to a polarity of the AC power source. In some examples, the switching circuit is controlled based at least in part on the synchronizing signal.

20 Claims, 23 Drawing Sheets

AC CHOPPING CIRCUIT AND ASSOCIATED SINGLE-PHASE AC MOTOR DRIVING SYSTEM

CROSS-REFERENCE TO RELATED APPLICATIONS

This application is a continuation of U.S. patent application Ser. No. 17/404,887, filed on Aug. 17, 2021, which claims priority to and the benefit of Chinese Patent Applications No. 202010830878.3, filed on Aug. 18, 2020, and Chinese Patent Applications No. 202011109622.X, filed on Oct. 16, 2020, all of which are incorporated herein by reference in their entirety.

TECHNICAL FIELD

The present application relates generally to electronic circuit, and more particularly but not exclusively relates to AC chopping circuit and single-phase AC motor driving system.

BACKGROUND

Single-phase motors generally refer to asynchronous motors which are supplied by single-phase AC (alternating current) power source provided by mains AC power. Since mains power supplies electricity conveniently and with cost-savings, single-phase motors are widely used not only for industrial usage but also for civil daily life usage. With the developing civil life quality, the required quantity of single-phase motors for housekeeping appliances such as electrical fans increases rapidly.

SUMMARY

In one embodiment, an AC chopping circuit comprises: a switching circuit having a first input, a second input, a first output and a second output, wherein the first input is coupled to a first terminal of an AC power source, the second input is coupled to a second terminal of the AC power source, the first output is coupled to a first terminal of a load, and the second output is coupled to a second terminal of the load; a synchronizing signal generating circuit configured to provide a synchronizing signal which is related to polarity of the AC power source; a switch driving circuit configured to control the switching circuit in accordance with the synchronizing signal; and an auxiliary power supplying circuit coupled to the switching circuit, the auxiliary power supplying circuit generating an auxiliary power to supply the switch driving circuit based on voltage signal in the switching circuit.

In another embodiment, a driving method for driving an AC motor comprises: coupling an AC power source to a switching circuit without a rectifying bridge coupled between the AC power source and the switching circuit; driving the switching circuit based on polarity of the AC power source; and providing an auxiliary power by coupling an input of an auxiliary power supplying circuit to the switching circuit and coupling a ground terminal of the auxiliary power supplying circuit to a reference terminal of the switching circuit.

In Example 1, an alternating current (AC) chopping circuit comprises a switching circuit comprising a first input terminal, a second input terminal, a first output terminal and a second output terminal, wherein the first input terminal is coupled to a first terminal of an AC power source, the second input terminal is coupled to a second terminal of the AC power source, the first output terminal is coupled to a first terminal of a load, and the second output terminal is coupled to a second terminal of the load; a synchronizing signal generating circuit configured to generate a synchronizing signal associated with a polarity of the AC power source; an overcurrent protection circuit configured to receive a first sensing signal indicating a first current flowing through the first input terminal and a second sensing signal indicating a second current flowing through the second input terminal, the overcurrent protection circuit configured to generate an overcurrent protection signal based at least in part on the first sensing signal and the second sensing signal; a switch driving circuit configured to control the switching circuit based at least in part upon the synchronizing signal and the overcurrent protection signal; and an auxiliary power supplying circuit coupled to the switching circuit, the auxiliary power supplying circuit generating an auxiliary power signal coupled to the switch driving circuit based at least in part on a voltage signal generated by the switching circuit.

In Example 2, the AC chopping circuit of Example 1, wherein the switching circuit has a reference terminal coupled to the auxiliary power supplying circuit and the switch driving circuit.

In Example 3, the AC chopping circuit of Example 1 or 2, further comprises a capacitor coupled between the first input terminal and the second input terminal of the switching circuit, wherein the switching circuit is disposed in an integrated packaged device.

In Example 4, the AC chopping circuit of Example 2, wherein the switching circuit comprises a first switching transistor coupled between the first input terminal and the first output terminal of the switching circuit, a second switching transistor coupled between a reference terminal and the first output terminal of the switching circuit, a third switching transistor coupled between the second input terminal and the second output terminal of the switching circuit, and a fourth switching transistor coupled between the reference terminal and the second output terminal of the switching circuit.

In Example 5, the AC chopping circuit of Example 4, wherein the switch driving circuit comprises a first half-bridge driving circuit configured to drive the first switching transistor and the second switching transistor, wherein the first half-bridge driving circuit is configured to turn on the first switching transistor and the second switching transistor simultaneously, and a second half-bridge driving circuit configured to drive the third switching transistor and the fourth switching transistor, wherein the second half-bridge driving circuit is configured to turn on the third switching transistor and the fourth switching transistor simultaneously. In some instances, the first half-bridge driving circuit is configured to selectively disable a first conduction interlock circuit in the first half-bridge driving circuit based on the synchronizing signal, and the second half-bridge driving circuit is configured to selectively disable a second conduction interlock circuit in the second half-bridge driving circuit based on the synchronizing signal.

In Example 6, the AC chopping circuit of Example 4, wherein the first switching transistor includes a first body diode coupled in parallel with a first transistor, wherein an anode of the first body diode is coupled to the first output terminal of the switching circuit, and a cathode of the first body diode is coupled to the first input terminal of the switching circuit; the second switching transistor includes a second body diode coupled in parallel with a second transistor, wherein an anode of the second body diode is coupled to the reference terminal of the switching circuit, and a cathode of the second body diode is coupled to the first output terminal of the switching circuit; the third switching transistor comprises a third body diode coupled in parallel with a third transistor, wherein an anode of the third body diode is coupled to the second output terminal of the switching circuit, and a cathode of the third body diode is coupled to the second input terminal of the switching circuit; and the fourth switching transistor comprises a fourth body diode coupled in parallel with a fourth transistor, wherein anode of the fourth body diode is coupled to the reference terminal of the switching circuit, and a cathode of the fourth body diode is coupled to the second output terminal of the switching circuit.

In Example 7, the AC chopping circuit of Example 4, wherein the auxiliary power supplying circuit includes an input terminal, an output terminal and a reference terminal, wherein the input terminal of the auxiliary power supplying circuit is coupled to at least one of the first input terminal and the second input terminal of the switching circuit, the output terminal of the auxiliary power supplying circuit is coupled to at least one of the switch driving circuit and the synchronizing signal generating circuit, and the reference terminal of the auxiliary power supplying circuit is coupled to the reference terminal of the switching circuit configured to form a current loop.

In Example 8, the AC chopping circuit of Example 4, wherein the auxiliary power supplying circuit comprises a fifth diode having an anode coupled to the second input terminal of the switching circuit, a sixth diode having an anode coupled to the first input terminal of the switching circuit; and a voltage converting circuit having a first input terminal, a second input terminal and an output terminal, wherein the first input terminal of the voltage converting circuit is coupled to at least one of a cathode of the fifth diode and a cathode of the sixth diode, the second input terminal of the voltage converting circuit is coupled to the reference terminal of the switching circuit, and the output terminal of the voltage converting circuit configured to output the auxiliary power signal.

In Example 9, the AC chopping circuit of Example 8, wherein the auxiliary power supplying circuit further comprises a seventh diode having an anode coupled to the second input terminal of the voltage converting circuit and a cathode coupled to the anode of the fifth diode; and an eighth diode having an anode coupled to the second input terminal of the voltage converting circuit and a cathode coupled to the anode of the sixth diode.

In Example 10, the AC chopping circuit of Example 4, wherein the auxiliary power supplying circuit comprises a first resistor having a first terminal coupled to the first input of the switching circuit; a second resistor having a first terminal coupled to the second input of the switching circuit, and a second terminal coupled to a second terminal of the first resistor; and a voltage converting circuit having a first input, a second input and an output, wherein the first input of the voltage converting circuit is coupled to the second terminal of the first resistor, the second input of the voltage converting circuit is coupled to the reference terminal of the switching circuit, and the output of the voltage converting circuit is configured to provide an auxiliary power.

In Example 11, the AC chopping circuit of Example 4, wherein when a voltage at the first input terminal of the switching circuit is less than a voltage at the second input of the switching circuit, the synchronizing signal indicates a positive half cycle working zone, and the switch driving circuit is configured to turn on the first switching transistor and the second switching transistor; control the third switching transistor performing a switching action with a duty cycle; and control the fourth switching transistor working at a rectification state. In some instances, when the voltage at the first input terminal of the switching circuit is higher than the voltage at the second input terminal of the switching circuit, the synchronizing signal indicates a negative half cycle working zone, the switch driving circuit is configured to turn on the third switching transistor and the fourth switching transistor; control the first switching transistor performing a switching action with a duty cycle; and control the second switching transistor working at a rectification state.

In Example 12, the AC chopping circuit of Example 11, wherein when the synchronizing signal indicates a dead zone between the positive half cycle working zone and the negative half cycle working zone, the switch driving circuit is configured to set at least two switching transistors to be off, the at least two switching transistors selected from a group consisting of the first switching transistor, the second switching transistor, the third switching transistor and the fourth switching transistor; and set one or two switching transistor to be on, the one or two switching transistors selected from a group consisting of the first switching transistor, the second switching transistor, the third switching transistor and the fourth switching transistor.

In Example 13, the AC chopping circuit of Example 12, wherein during the dead zone, the switch driving circuit is configured to set the first switching transistor and the third switching transistor to be on, and set the second switching transistor and the fourth switching transistor to be off.

In Example 14, the AC chopping circuit of Example 12, wherein during the dead zone, the switch driving circuit is configured to set the second switching transistor and the fourth switching transistor to be on, and set the first switching transistor and the third switching transistor to be off.

In Example 15, the AC chopping circuit of Example 4, wherein the synchronizing signal generating circuit comprises a differential amplifying circuit configured to generate an AC signal with reference to the reference terminal of the switching circuit based on the AC power source; a first comparing circuit having a first input coupled to an output of the differential amplifying circuit, a second input configured to receive a first threshold signal, and an output configured to provide a first synchronizing signal; and a second comparing circuit having a first input coupled to the output of the differential amplifying circuit, a second input configured to receive a second threshold signal, and an output configured to provide a second synchronizing signal.

In Example 16, the AC chopping circuit of Example 1, wherein the synchronizing signal includes a first synchronizing signal and a second synchronizing signal. In some instances, when the AC power source is higher than a first threshold signal, the first synchronizing signal is set at a first state and the second synchronizing signal is set at a second state, the second state being different from the first state; when the AC power source is lower a second threshold signal, the first synchronizing signal is set at the second state and the second synchronizing signal is set at the first state; and when the AC power source is lower than the first threshold signal and higher than the second threshold signal, the first synchronizing signal and the second synchronizing signal are set at a same state selected from the first state and the second state. In some instances, the first threshold signal is a positive voltage signal and the second threshold signal is a negative voltage signal.

In Example 17, the AC chopping circuit of Example 4, wherein the overcurrent protection circuit includes a first sensing resistor and a second sensing resistor, wherein the first sensing resistor is coupled to the first switching transistor, wherein the second sensing resistor is coupled to the third switching transistor.

In Example 18, a driving method for driving an AC motor, comprises coupling an AC power source to a switching circuit without a rectifying bridge coupled between the AC power source and the switching circuit; generating an overcurrent protection signal based on a sensing signal indicating a current flowing through a terminal of the switching circuit; driving the switching circuit based on a polarity of the AC power source and the overcurrent protection signal; generating an auxiliary power signal based at least in part on a signal generated by the switch signal; providing the auxiliary power signal to a control circuit coupled to the switching circuit; and generating, by the switching circuit, an output to the AC motor.

In Example 19, the driving method of Example 18 further comprises turning on a first bridge arm of the switching circuit and chopping a second bridge arm of the switching circuit when the AC power source is in a first half cycle working zone, wherein the first bridge arm is coupled between a first terminal of the AC power source and a reference terminal of the switching circuit, wherein the second bridge arm is coupled between a second terminal of the AC power source and the reference terminal of the switching circuit; and turning on the second bridge arm and chopping the first bridge arm when the AC power source is in a second half cycle working zone.

In Example 20, the driving method of Example 18, wherein the switching circuit is coupled to a capacitor, wherein the switching circuit is disposed in an integrated packaged device.

BRIEF DESCRIPTION OF THE DRAWINGS

Non-limiting and non-exhaustive embodiments are described with reference to the following drawings. The drawings are only for illustration purpose. Usually, the drawings only show part of the circuits/devices of the embodiments. The above mentioned and other features and objects of this disclosure, and the manner of attaining them, will become more apparent and the disclosure itself will be better understood by reference to the following description of an embodiment of the disclosure taken in conjunction with the accompanying drawings, wherein.

Figure 1:
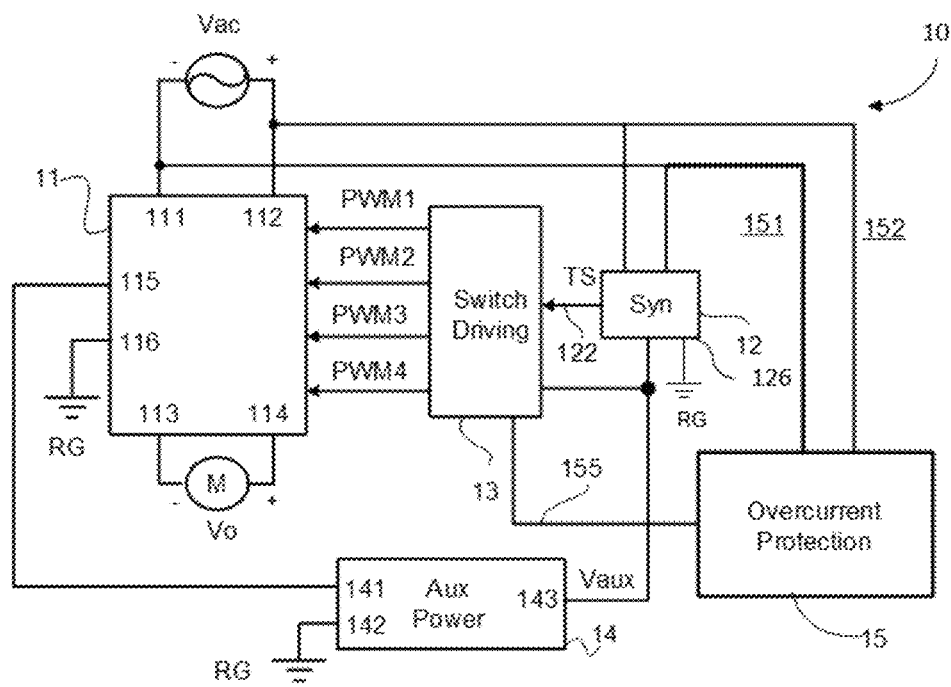
FIG. 1 illustrates a block diagram of a driving system for driving a single-phase AC motor according to certain embodiments of the present application.

The drawings are only schematic and are non-limiting. In the drawings, the size is not drawn on scale. Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present disclosure, numerous specific details are set forth in order to provide a thorough understanding of the present disclosure. However, it will be obvious to one of ordinary skill in the art that the present disclosure may be practiced without these specific details. In other instances, well-known methods, procedures, components, and circuits have not been described in detail so as not to unnecessarily obscure aspects of the present disclosure.

The term "couple" as used herein, is defined as either directly connecting, or indirectly connecting one to another via intermediary such as via an electrical conducting medium, e.g., a conductor, which may have a parasitic inductance or capacitance; also including connection via other active or passive devices, e.g., circuit(s) or component(s) such as a switch or a follower circuit, or via signal amplifying circuit(s) or component(s) as would be known to a person skilled in the art, which can realize the same or similar function or purpose. "A and/or B" includes the situation of both having A and B, and the situation of having either A or B.

A single-phase motor regulates its rotation speed by using a motor driving circuit.

One type of motor driving circuit adopts inductor to regulate rotation rate. By adjusting the inductance of a serially coupled inductor at several taps, the inductance ratio between the auxiliary winding and the main winding of the driving circuit is adjusted and thus the rotation rate is adjusted. However, this driving approach has limited steps of rotation rate, and cannot start or regulate at low rotation rate.

Another type of motor driving circuit adopts serially coupled electrical reactor. This approach can fulfill stepless rotation rate regulation. However, the regulating range is also limited, the size of an electrical reactor is too big, and the efficiency is low.

A third type of motor driving circuit adopts a bidirectional thyristor to regulate the rotation rate. This approach has wide usage for its low cost and simple structure. However, at low rotation rate, the voltage has high distortion, thus the power factor is low and may not meet the PF requirement of mains AC power. Further, this approach has high torque ripple and high noise.

A fourth type of possible motor driving method adopts AC chopper, several electrically isolated auxiliary power sources, and many high voltage devices, for example, 8 high voltage diodes and 2 high voltage bidirectional switches which connect to separate grounds. And further the high voltage devices require to be electrically isolated from the control circuit. Accordingly, this approach is difficult to be integrated with high complexity and high cost.

Another type of motor driving circuit may adopt frequency conversion inverter to regulate the rotation rate. This approach requires an AC-DC (alternating current to direct current) converter for rectifying and filtering an AC power into a constant DC power and a frequency conversion inverter for chopping a square waveform. Though this approach may regulate the width and frequency simultaneously, it requires large capacitor after a rectifying and filtering circuit or requires an AC-DC switching circuit to obtain a constant DC power, and further requires complex frequency conversion inverter to provide a variable-frequency-AC voltage source. Accordingly, this approach has large size, high cost and complex system control. Also, the power factor is low due to the existence of large capacitor. For example, the half load power factor is usually between 0.5 to 0.6. Thus, additional PFC (power factor correction) circuit is required which further adds on cost and power loss. In some embodiments, the switching circuit including one or more switching transistors. As used herein, a switching transistor includes one or more transistors, one or more switches, and/or one or more diodes.

Yet another method adopts AC chopper having a rectifying bridge which rectifies the input AC power into half-wave rectified voltage, and then the rectified voltage is chopped by a bridge circuit with high frequency and folds the negative half cycle back. This kind of chopper can effectively overcome the shortcomings of a thyristor chopper and achieve low harmonic and low cost. But the rectifying bridge in this scheme needs to bear a large current, which brings a large conduction loss, increases the difficulty of heat dissipation, reduces the efficiency and increases the cost.

Accordingly, improved solution is required to address one or more deficiencies in the above approaches.

FIG. 1 illustrates a block diagram of a driving system for driving a single-phase AC motor according to certain embodiments of the present disclosure. The driving system for single-phase AC motor comprises: an AC power source Vac, an AC chopping circuit and an AC load M, wherein the AC chopping circuit chops the AC power source Vac directly and provides an AC driving signal for driving the AC load M. In some embodiments, the AC load M comprises an AC motor. The AC chopping circuit performs AC chopping function with no rectifying bridge, wherein the AC power source is supplied to switching circuit of the AC chopping circuit directly and is chopped alternatingly according to the polarity of the input AC power source Vac. Accordingly, a rectifying bridge is not required between the AC power source and the switching circuit, and thus additional conduction loss brought by the rectifying bridge is eliminated which helps integrating modules with higher power.

In the example illustrated in FIG. 1, the AC chopping circuit 10 comprises a switching circuit 11, a synchronizing signal generating circuit 12, a switch driving circuit 13 and an auxiliary power supplying circuit 14. Although the above has been shown using a selected group of components for the AC chopping circuit 10, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification. In some variations, certain components or all components of the AC chopping circuit 10 are integrated into an integrated chip (IC).

The input terminals 111 and 112 of the switching circuit 11 are coupled to the AC power source Vac directly, and the output terminals of the switching circuit 11 provide AC output voltage Vo based on the switching action of the switching circuit 11 for driving the motor M. The AC output voltage Vo is an AC chopping signal, and by controlling the duty cycle of the switching action of at least part of the switches in the switching circuit 11, the duty cycle of the output voltage Vo at output terminals of the switching circuit 11 can be regulated, and the average value of the output voltage Vo can be regulated, and accordingly stepless speed control for the motor M can be achieved. This topology eliminates a rectifying bridge between the AC power source Vac and the switching circuit 11, simplifies the system, reduces the number of the discrete devices, and achieves small volume, high power efficiency and facilitates integrating module with higher power.

The switching circuit 11 has a first input terminal 111, a second input terminal 112, a first output terminal 113 and a second output terminal 114, wherein the first input terminal 111 is coupled to a first terminal of the AC power source Vac, the second input is coupled to a second terminal of the Ac power source Vac, the first output terminal 113 is coupled to a first terminal of motor M, and the second output terminal 114 is coupled to a second terminal of motor M. The synchronizing signal generating circuit 12 is coupled to the first terminal and the second terminal of the AC power source Vac, and provides at the output of the synchronizing signal generating circuit 12 a synchronizing signal 122 (e.g., TS) which is related to the polarity of the AC power source Vac.

According to certain embodiments, the synchronizing signal generating circuit obtains signal representative of the polarity of the AC power source AC from other parts of the system, for example, from the output of an EMI (Electro-Magnetic Interference) filter which is coupled to the AC power source Vac. In some embodiments, the AC power source Vac is a main power source which is an AC sinusoidal signal having a frequency of 50 Hz and an amplitude of 220 Volts, or having a frequency of 60 Hz and an amplitude of 110 Volts, etc. In one embodiment, the synchronizing signal 122 (e.g., TS) is in a first state when the AC power source Vac is in its positive half cycle of the sinusoidal signal, or presents a positive half cycle working signal; and the synchronizing signal 122 (e.g., TS) is in a second state when the AC power source Vac is in its negative half cycle of the sinusoidal signal, or presents a negative half cycle working signal, and wherein during the positive half cycle, the voltage at the first input terminal 111 is less than the voltage at the second input terminal 112, and during the negative half cycle, the voltage at the first input terminal 111 is higher than the voltage at the second input terminal 112 of the switching circuit 11, where the first state is different from the second state. In some embodiments, the synchronizing signal 122 (e.g., TS) includes a positive half cycle working signal, a negative half cycle working signal, and a dead zone signal between the positive half cycle working signal and the negative half cycle working signal.

According to some embodiments, the switch driving circuit 13 generates switching control signals PWM1-PWM4 based on the synchronizing signal 122 (e.g., TS) to control the switching circuit 11. The switch driving circuit 13 generates pulse width modulation (PWM) signals having a second frequency for chopping at least part of the switches of the switching circuit 11, where the second frequency is higher than a first frequency of the AC power source Vac. Accordingly, at least part of the switches chop by performing switching action at the second frequency, and an AC chopping signal Vo is generated between the first output terminal 113 and the second output terminal 114 of the switching circuit 11, where the AC chopping signal Vo has an enveloping line which synchronizes with the AC power source Vac. By controlling the duty cycle of the PWM signals, the average voltage of the AC output signal Vo is regulated. The switch driving circuit 13 may generate the switching control signals PWM1-PWM4 further based on feedback signals such as current sensing signal, in order to control the duty cycle more accurately. In one embodiment, the second frequency is 10 times higher than the frequency of the AC power source Vac.

According to certain embodiments, the auxiliary power supplying circuit 14 is coupled to the switching circuit 11 and generates an auxiliary power Vaux based on voltage signal(s) of the switching circuit 11 and provides auxiliary power Vaux for the switch driving circuit 13 and/or the synchronizing signal generating circuit 12. In some embodiments, the switching circuit 11 has a reference terminal 116 (e.g., RG) which is coupled to the auxiliary power supplying circuit 14 and the switch driving circuit 13 and functions as ground of the auxiliary power supplying circuit 14 and the switch driving circuit 13. Via obtaining the voltage signal(s) of the switching circuit 11 and coupling to the reference terminal 116 (e.g., RG), the auxiliary power supplying circuit 14 forms a current loop together with the switching circuit 11 and provides power for the auxiliary power supplying circuit 14. In some embodiments, the reference terminal 116 (e.g., RG) functions as system ground of the driving system, and achieves non-isolation system control, and further simplifies the system and cost.

According to some embodiments, the auxiliary power supplying circuit 14 has an input terminal 141, a reference ground terminal 142 (e.g., RG) and an output terminal 143, where the input terminal 141 of the auxiliary power supplying circuit 14 is coupled to a first terminal 115 of the switching circuit 11, the reference ground terminal 142 of the auxiliary power supplying circuit 14 is coupled to the reference terminal 116, or referred to as a second terminal 116 of the switching circuit 11, and the output terminal 143 of the auxiliary power supplying circuit 14 provides the auxiliary power Vaux for supplying the switch driving circuit 13 and/or the synchronizing signal generating circuit 12. In some embodiments, a current path is formed via at least one body diode of the switching circuit 11 from the second terminal 116 to the first terminal 115 of the switching circuit 11, or a switch of the switching circuit 11 is turned on to form the current path. In some examples, a current loop is formed among the switching circuit 11 and the auxiliary power supplying circuit 14, and the voltage(s) of the switching circuit supplies the auxiliary power supplying circuit 14 to form the auxiliary voltage Vaux. Thus, the auxiliary power supplying circuit 14 is provided without complex electrical isolation approach.

The above AC chopping circuit can achieve stepless regulation for motor by AC chopping function without rectifying bridge, and may have advantages of small volume, high efficiency and ease of integrating high power modules.

According to certain embodiments, the switching circuit 11 has a reference terminal 116 (e.g., RG) coupled to the synchronizing signal generating circuit 12, the switch driving circuit 13 and the auxiliary power supplying circuit 14, and functioning as common ground of the synchronizing signal generating circuit 12, the switch driving circuit 13 and the auxiliary power supplying circuit 14 to make the system work. In some examples, the synchronizing signal generating circuit 12 includes a reference terminal 126 that is coupled to the reference ground (e.g., RG).

In some embodiments, the AC chopping circuit is used to drive an AC motor such as a single-phase AC motor. In some examples, the AC chopping circuit of the present application may be used to drive other types of load.

According to certain embodiments, the current 151 flowing through the first input terminal 111 being sensed and/or detected and the current 152 flowing through the second input terminal 112 being sensed and/or detected are provided to the overcurrent protection circuit 15. In some examples, the overcurrent protection circuit 15 generates an overcurrent indication signal 155 and provided to the switching driving circuit 13. In certain examples, the overcurrent indication signal 155 is used to control the switching circuit 11.

According to some embodiments, a driving method for driving an AC motor is provided which comprises the process including: coupling an AC power source to a switching circuit without a rectifying bridge coupled between the AC power source and the switching circuit; driving the switching circuit based on polarity of the AC power source; and providing an auxiliary power by coupling an input of an auxiliary power supplying circuit to the switching circuit and coupling a ground terminal of the auxiliary power supplying circuit to a reference terminal (e.g., RG) of the switching circuit.

According to certain embodiments, a part of or all of the components in the AC chopping circuit 10 is integrated into one or more integrated chips (ICs). In some examples, a part of or all of the components in the switching circuit 11, the synchronizing signal generating circuit 12, the switching driving circuit, the auxiliary power supply circuit 14, and/or the overcurrent protection circuit 15 are integrated into one or more ICs.

Figure 2:
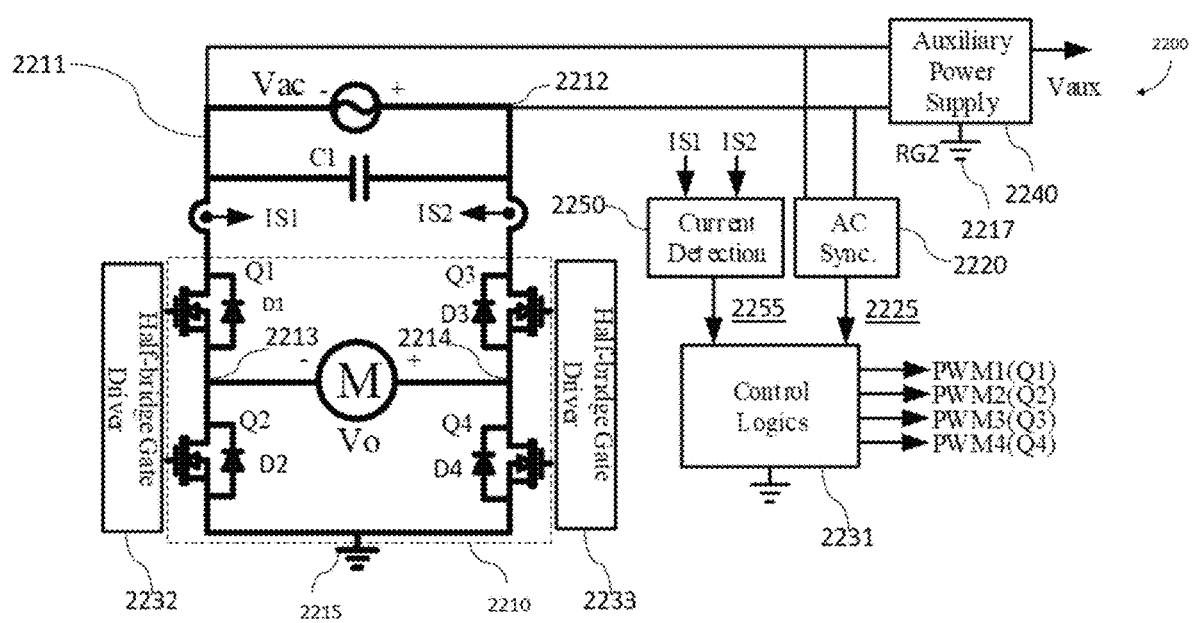
FIG. 2 illustrates a schematic circuit diagram of an AC chopping system according to certain embodiments of the present disclosure.

FIG. 2 illustrates a schematic circuit diagram of an AC chopping system 2200 according to certain embodiments of the present disclosure. The AC chopping system 2200 includes a switching circuit 2210, a synchronizing signal generating circuit 2220, a switch driving circuit and an auxiliary power supplying circuit 2240. Although the above has been shown using a selected group of components for the AC chopping system 2200, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification. In some variations, certain components of the AC chopping system 2200 are integrated into an IC (integrated chip).

In some examples, the switching circuit 2210 comprises a first switching transistor Q1, a second switching transistor Q2, a third switching transistor Q3 and a fourth switching transistor Q4. As used herein, a switching transistor refers to a switch and/or a transistor. The first switching transistor Q1 is coupled between a first input terminal 2211 and a first output terminal 2213 of the switching circuit, the second switching transistor Q2 is coupled between the first output terminal 2213 and a reference terminal 2215 (e.g., RG), the third switching transistor Q3 is coupled between a second input terminal 2212 and a second output terminal 2214, and a fourth switching transistor Q4 is coupled between the second output terminal 2214 and the reference terminal 2215 (e.g., RG).

According to some embodiments, each switching transistor of Q1-Q4 has a parallel body diode. The first switching transistor Q1 has a first body diode D1 parallelly coupled with the first switching transistor Q1, where an anode of the first body diode D1 is coupled to the first output terminal 2213 and a cathode of the first body diode D1 is coupled to the first input terminal 2211. The second switching transistor Q2 has a second body diode D2 parallelly coupled, wherein an anode of the second body diode D2 is coupled to the reference terminal 2215 (e.g., RG) and a cathode of the second body diode D2 is coupled to the first output terminal 2213. The third switching transistor Q3 has a third body diode D3 parallelly coupled, wherein an anode of the third body diode D3 is coupled to the second output terminal 2214 and a cathode of the third body diode D3 is coupled to the second input terminal 2212. And the fourth switching transistor Q4 has a fourth body diode D4 parallelly coupled, wherein an anode of the fourth body diode D4 is coupled to the reference terminal 2215 (e.g., RG) and a cathode of the fourth body diode D4 is coupled to the second output terminal 2214.

According to certain embodiments, switching transistors Q1-Q4 each may comprise a MOSFET (Metal Oxide Semiconductor Field Effect Transistor), a JFET (Junction Field Effect Transistor) or an IGBT (Insulated Gate Bipolar Transistor), etc. In some embodiments, as shown, each of the switching transistors Q1-Q4 comprises a MOSFET and has a parasitic body diode which works in non-synchronous rectification mode. In certain examples, each of the switching transistors Q1-Q4 may have a switch module comprising several switching transistors coupled in parallel, or, comprising a switching transistor and a diode coupled in parallel with each other. In some examples, Q2 and Q4 include FRD MOSFET (e.g., MOSFET with fast recovery diode), and Q1 and Q3 include regular MOSFET. In certain examples, when the load (e.g., motor M) is almost purely resistive such that most of the time Q2 and Q4 works in rectifier mode (i.e., when body diode is conducting), and Q1 and Q3 works in active mode (i.e., when body diode is not conducting). In some variations, with Q1 and Q3 including MOSFETs and Q2 and Q4 including FRD MOSFETs, the reverse recovery effect is not apparent, and the relevant reverse recovery loss is acceptable. As an example, Q2 and Q4 each includes a fast recovery diode. For example, Q2 and Q4 each includes a fast recovery diode connected parallel with a transistor.

According to some embodiments, the synchronizing signal generating circuit 2220 is coupled to a first terminal and a second terminal of an AC power source Vac, which is also coupled to the first input terminal 2211 and the second input terminal 2212 of the switching circuit.

As illustrated in FIG. 2, the switch driving circuit may include a control logic circuit 2231, a first half-bridge driving circuit 2232 and a second half-bridge driving circuit 2233. The first half-bridge driving circuit 2232 and the second half-bridge driving circuit 2233 amplify the logic signals generated by the control logic circuit 2231 and provide driving signals which are suitable for driving the switching transistors Q1-Q4. The first half-bridge driving circuit 2232 is coupled to the control terminals of the first switching transistor Q1 and the second switching transistor Q2 respectively for driving the first switching transistor Q1 and the second switching transistor Q2. The second half-bridge driving circuit 2233 is coupled to the control terminals of the third switching transistor Q3 and the fourth switching transistor Q4 respectively for driving the third switching transistor Q3 and the fourth switching transistor Q4.

In some examples, the first half-bridge driving circuit 2232 selectively disables a first conduction interlock circuit in the first half-bridge driving circuit 2232 to allow the first switching transistor Q1 and the second switching transistor Q2 in ON state simultaneously. In certain examples, the second half-bridge driving circuit 2233 selectively disables a second conduction interlock circuit in the second half-bridge driving circuit 2233 and allows the third switching transistor Q3 and the fourth switching transistor Q4 in ON state simultaneously.

According to certain embodiments, by selecting a reference terminal 2215 (e.g., RG) of the switching circuit and functioning as the reference ground of the switch driving circuit, the synchronizing signal generating circuit 2220 and the auxiliary power supplying circuit 224, the first half-bridge driving circuit 2232 and the second half-bridge driving circuit 2233 of this embodiment can adopt non-isolated driving circuit without the use of isolation devices such as transformers. Thus, the system complexity, volume and cost are further reduced. Specifically, the first half-bridge driving circuit 2232 can be used to turn on the first switching transistor Q1 and the second switching transistor Q2 simultaneously during the positive half cycle working zone, and the second half-bridge driving circuit 2233 can be used to turn on the third switching transistor Q3 and the fourth switching transistor Q4 simultaneously during the negative half cycle working zone. The auxiliary power supplying circuit 2240 is coupled to the first input terminal 2211 and/or the second input terminal 2212 of the switching circuit to provide an auxiliary power Vaux for the switch driving circuit and/or the synchronizing signal generating circuit 2220. In some examples, the reference terminal 2215 (e.g., RG) is selected at the sources of transistors (e.g., switching transistor Q2, switching transistor Q4).

According to some embodiments, the auxiliary power supplying circuit 2240 has a reference terminal 2217 (e.g., RG2), which functions as the reference ground of the auxiliary power supplying circuit 224 and is coupled to the reference terminal RG of the switching circuit. In one embodiment, the auxiliary power supplying circuit 2240 has a first input, a second input, an output and a reference terminal 2217 (e.g., RG2), wherein the first input and the second input of the auxiliary power supplying circuit 2240 are respectively coupled to the first input terminal 2211 and the second input terminal 2212 of the switching circuit or coupled to the first output terminal 2213 and the second output terminal 2214 of the switching circuit.

According to certain embodiments, the output of the auxiliary power supplying circuit 2240 is coupled to the switch driving circuit for supplying power for the switch driving circuit, and the reference terminal 2217 (e.g., RG2) of the auxiliary power supplying circuit 2240 is coupled to the reference terminal 2215 (e.g., RG) of the switching circuit 2210 to form a current loop between the auxiliary power supplying circuit 2240 and the switching circuit. The switching circuit or AC power source Vac can charge a capacitor in the auxiliary power supplying circuit 2240 both in the positive half cycle and the negative half cycle of the AC power source Vac. In one embodiment, the auxiliary power supplying circuit has only one input coupled to the switching circuit, for example, the input of the auxiliary power supplying circuit is coupled to any one of the first input terminal 2211, the second input terminal 2212, the first output terminal 2213 and the second output terminal 2214 of the switching circuit, and the switching circuit or AC power source charges the capacitor of the auxiliary power supplying circuit 224 only in the positive half cycle or only in the negative half cycle of the AC power source Vac.

According to certain embodiments, the synchronizing signal generating circuit 2220 obtains signal representative of the polarity of the AC power source AC from other parts of the system, for example, from the output of an EMI (Electro-Magnetic Interference) filter which is coupled to the AC power source Vac. In some embodiments, the AC power source Vac is a main power source which is an AC sinusoidal signal having a frequency of 50 Hz and an amplitude of 220 Volts, or having a frequency of 60 Hz and an amplitude of 110 Volts, etc. In one embodiment, the synchronizing signal 2225 (e.g., TS) is in a first state when the AC power source Vac is in its positive half cycle of the sinusoidal signal, or presents a positive half cycle working signal; and the synchronizing signal 2225 (e.g., TS) is in a second state when the AC power source Vac is in its negative half cycle of the sinusoidal signal, or presents a negative half cycle working signal, and wherein during the positive half cycle, the voltage at the first input terminal 2211 is less than the voltage at the second input terminal 2212, and during the negative half cycle, the voltage at the first input terminal 2211 is higher than the voltage at the second input terminal 2212 of the switching circuit 2210, where the first state is different from the second state. In some embodiments, the synchronizing signal 2225 (e.g., TS) includes a positive half cycle working signal, a negative half cycle working signal, and a dead zone signal between the positive half cycle working signal and the negative half cycle working signal.

In some examples, the current I1 flowing through the first switching transistor Q1 is sensed by sensing voltage of the first input terminal 2211 relative to the first output terminal 2213 or the reference terminal RG, and the current I2 flowing through the third switching transistor Q3 is sensed by sensing voltage of the second input terminal 2212 relative to the second output terminal 2214 or the reference terminal 2215 (e.g., RG). In some examples, the sensed current I1 and/or the sensed current I2 input to a current detection circuit 2250. The current detection circuit 2250 generates an overcurrent indication signal 2255.

The switch driving circuit generates switching control signals PWM1-PWM4 based on the synchronizing signal 2225 (e.g., TS) and/or the overcurrent indication signal 2255, in order to control the switching transistors Q1-Q4 in the switching circuit. As will be discussed in further details below, the current sensing signals may be used for comparison with a predetermined current threshold signal to further control the switching circuit. In some examples, a resistance value of a bias resistor can be selected to adjust current control level, e.g., to adjust an overcurrent protection point in order to realize timely overcurrent or short-circuit protection of the system.

Figure 3:
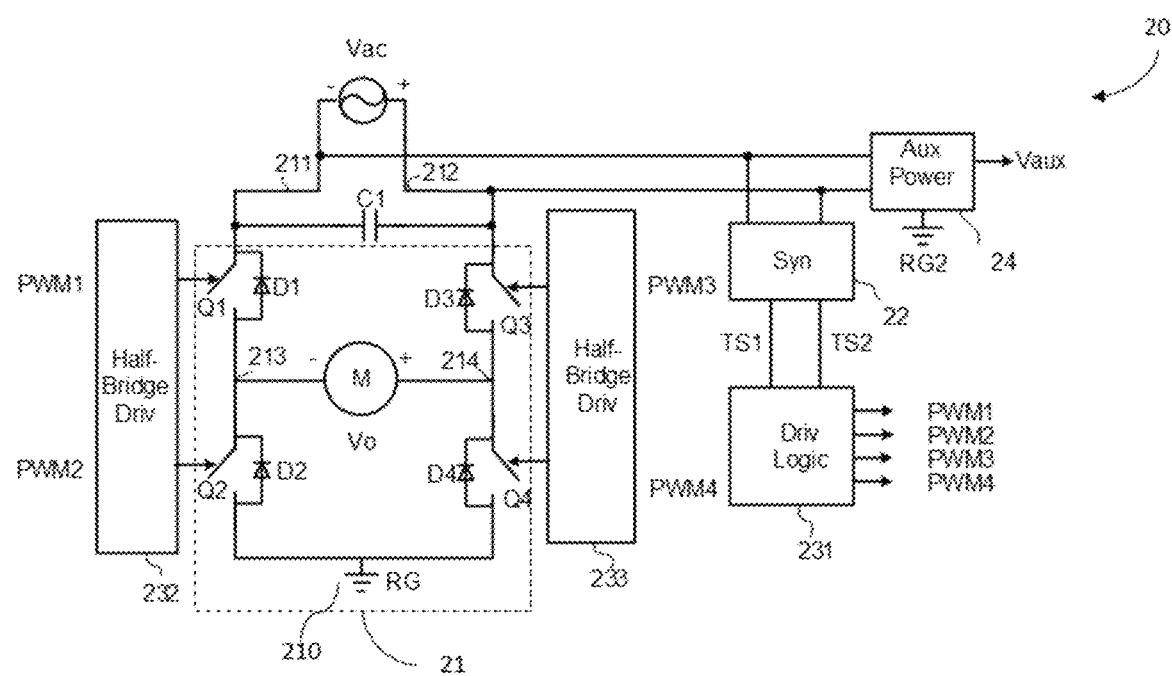
FIG. 3 illustrates a schematic circuit diagram of an AC chopping system according to certain embodiments of the present disclosure.

FIG. 3 illustrates a schematic circuit diagram of an AC chopping system 20 according to certain embodiments of the present disclosure. The AC chopping system 30 includes the switching circuit comprises a first switching transistor Q1, a second switching transistor Q2, a third switching transistor Q3 and a fourth switching transistor Q4. Although the above has been shown using a selected group of components for the AC chopping system 2200, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification. In some variations, certain components of the AC chopping system 20 are integrated into an IC (integrated chip).

According to some embodiments, the first switching transistor Q1 is coupled between a first input terminal 211 and a first output terminal 213 of the switching circuit, the second switching transistor Q2 is coupled between the first output terminal 213 and a reference terminal RG, the third switching transistor Q3 is coupled between a second input terminal 212 and a second output terminal 214, and a fourth switching transistor Q4 is coupled between the second output terminal 214 and the reference terminal RG. Where each switching transistor of Q1-Q4 has a parallel body diode. The first switching transistor Q1 has a first body diode D1 parallelly coupled with the first switching transistor Q1, wherein an anode of the first body diode D1 is coupled to the first output terminal 213 and a cathode of the first body diode D1 is coupled to the first input terminal 211. The second switching transistor Q2 has a second body diode D2 parallelly coupled, wherein an anode of the second body diode D2 is coupled to the reference terminal RG and a cathode of the second body diode D2 is coupled to the first output terminal 213. The third switching transistor Q3 has a third body diode D3 parallelly coupled, wherein an anode of the third body diode D3 is coupled to the second output terminal 214 and a cathode of the third body diode D3 is coupled to the second input terminal 212. And the fourth switching transistor Q4 has a fourth body diode D4 parallelly coupled, wherein an anode of the fourth body diode D4 is coupled to the reference terminal RG and a cathode of the fourth body diode D4 is coupled to the second output terminal 214.

According to certain embodiments, switching transistors Q1-Q4 each may comprise a MOSFET (Metal Oxide Semiconductor Field Effect Transistor), a JFET (Junction Field Effect Transistor) or an IGBT (Insulated Gate Bipolar Transistor), etc. In some embodiments, each of the switching transistors Q1-Q4 comprises a MOSFET and has a parasitic body diode which works in non-synchronous rectification mode. In another embodiment, each of the switching transistors Q1-Q4 may has a switch module comprising several switching transistors coupled in parallel, or, comprising a switching transistor and a diode coupled in parallel with each other. In some examples, Q2, Q4 include FRD MOSFET (e.g., MOSFET with fast recovery diode) and Q1, Q3 include regular MOSFET. In certain examples, when the load (e.g., motor M) is almost purely resistive such that most of the time Q2 and Q4 works in rectifier mode (i.e., when body diode is conducting), and Q1 and Q3 works in active mode (i.e., when body diode is not conducting). In some variations, with Q1 and Q3 including MOSFETs and Q2 and Q4 including FRD MOSFETs, the reverse recovery effect is not apparent, and the relevant reverse recovery loss is acceptable. As an example, Q2 and Q4 each includes a fast recovery diode. For example, Q2 and Q4 each includes a fast recovery diode connected parallel with a transistor.

The synchronizing signal generating circuit 22 is coupled to a first terminal and a second terminal of an AC power source Vac, which is also coupled to the first input terminal 211 and the second input terminal 212 of the switching circuit, and provides synchronizing signals TS1 and TS2 at the output terminals of the synchronizing signal generating circuit 22. Synchronizing signals TS1 and TS2 may also be generated based on a synchronizing signal TS as shown in FIG. 1.

According to some embodiments, the switch driving circuit generates switching control signals PWM1-PWM4 based on the first synchronizing signal TS1 and the second synchronizing signal TS2, in order to control the switching transistors Q1-Q4 in the switching circuit 21. As illustrated in FIG. 3, the switch driving circuit may comprise a driving logic circuit 231, a first half-bridge driving circuit 232 and a second half-bridge driving circuit 233. The first half-bridge driving circuit 232 and the second half-bridge driving circuit 233 amplify the logic signals generated by the driving logic circuit 231 and provide driving signals which are suitable for driving the switching transistors Q1-Q4. The first half-bridge driving circuit 232 is coupled to the control terminals of the first switching transistor Q1 and the second switching transistor Q2 respectively for driving the first switching transistor Q1 and the second switching transistor Q2. The second half-bridge driving circuit 233 is coupled to the control terminals of the third switching transistor Q3 and the fourth switching transistor Q4 respectively for driving the third switching transistor Q3 and the fourth switching transistor Q4.

According to certain embodiments, to be different from the other half-bridge driving circuit which cannot turn on the two switches of a same bridge arm simultaneously, the first half-bridge driving circuit 232 selectively disables a first conduction interlock circuit in the first half-bridge driving circuit 232 to allow the first switching transistor Q1 and the second switching transistor Q2 in ON state simultaneously. And the second half-bridge driving circuit 233 selectively disables a second conduction interlock circuit in the second half-bridge driving circuit 233 and allows the third switching transistor Q3 and the fourth switching transistor Q4 in ON state simultaneously.

According to some embodiments, the AC chopping system/circuit 20 selects a reference terminal 210 (e.g., RG) of the switching circuit 21 functioning as the reference ground of the switch driving circuit, the synchronizing signal generating circuit 22 and the auxiliary power supplying circuit 24, the first half-bridge driving circuit 232 and the second half-bridge driving circuit 233 of this embodiment can adopt non-isolated driving circuit without the use of isolation devices such as transformers. Thus, the system complexity, volume and cost are further reduced. Specifically, the first half-bridge driving circuit 232 can be used to turn on the first switching transistor Q1 and the second switching transistor Q2 simultaneously during the positive half cycle working zone, and the second half-bridge driving circuit 233 can be used to turn on the third switching transistor Q3 and the fourth switching transistor Q4 simultaneously during the negative half cycle working zone. In some examples, the reference terminal 210 (e.g., RG) is selected at the sources of transistors (e.g., switching transistor Q2, switching transistor Q4).

According to certain embodiments, the auxiliary power supplying circuit 24 is coupled to the first input terminal 211 and/or the second input terminal 212 of the switching circuit 21 to provide an auxiliary power Vaux for the switch driving circuit and/or the synchronizing signal generating circuit 22. The auxiliary power supplying circuit 24 has a reference terminal RG2, which functions as the reference ground of the auxiliary power supplying circuit 24. In some examples, the reference terminal is coupled to or directly connected to the reference terminal 210 (e.g., RG) of the switching circuit 21. In one embodiment, the auxiliary power supplying circuit 24 has a first input, a second input, an output and a reference terminal RG2, wherein the first input and the second input of the auxiliary power supplying circuit 24 are respectively coupled to the first input terminal 211 and the second input terminal 212 of the switching circuit 21 or coupled to the first output terminal 213 and the second output terminal 214 of the switching circuit 21. The output of the auxiliary power supplying circuit 24 is coupled to the switch driving circuit for supplying power for the switch driving circuit, and the reference terminal RG2 of the auxiliary power supplying circuit 24 is coupled to the reference terminal RG of the switching circuit 21 to form a current loop between the auxiliary power supplying circuit 24 and the switching circuit 21.

According to some embodiments, the switching circuit 21 or AC power source Vac can charge a capacitor in the auxiliary power supplying circuit 24 both in the positive half cycle and the negative half cycle of the AC power source Vac. In one embodiment, the auxiliary power supplying circuit has only one input coupled to the switching circuit 21, for example, the input of the auxiliary power supplying circuit is coupled to any one of the first input terminal 211, the second input terminal 212, the first output terminal 213 and the second output terminal 214 of the switching circuit 21, and the switching circuit 21 or AC power source charges the capacitor of the auxiliary power supplying circuit 24 only in the positive half cycle or only in the negative half cycle of the AC power source Vac.

In the embodiment as shown in FIG. 3, the AC chopping circuit further comprises a first capacitor C1, which is coupled between the first input terminal 211 and the second input terminal 212 of the switching circuit 21. The first capacitor C1 can be used to absorb high frequency harmonic waveforms. In one embodiment, the AC chopping circuit further includes an EMI filter, which is coupled between the first terminal and the second terminal of the AC power source Vac. The first capacitor C1 and the capacitor required by the EMI filter can be shared in common, thus no discrete capacitor C1 is required and thus to reduce the number of components and volume of the system. In another embodiment, the AC chopping circuit comprises two capacitors, which are respectively connected in parallel with the two bridge arms of the switching circuit 21, that is, a first terminal of the first capacitor is coupled to the first input terminal 211 of the switching circuit 21 and a second terminal of the first capacitor is coupled to the reference terminal RG of the switching circuit 21, and a first terminal of the second capacitor is coupled to the second input terminal 212 of the switching circuit 21 and a second terminal of the second capacitor is coupled to the reference terminal 210 (e.g., RG) of the switching circuit 21.

Figure 4:
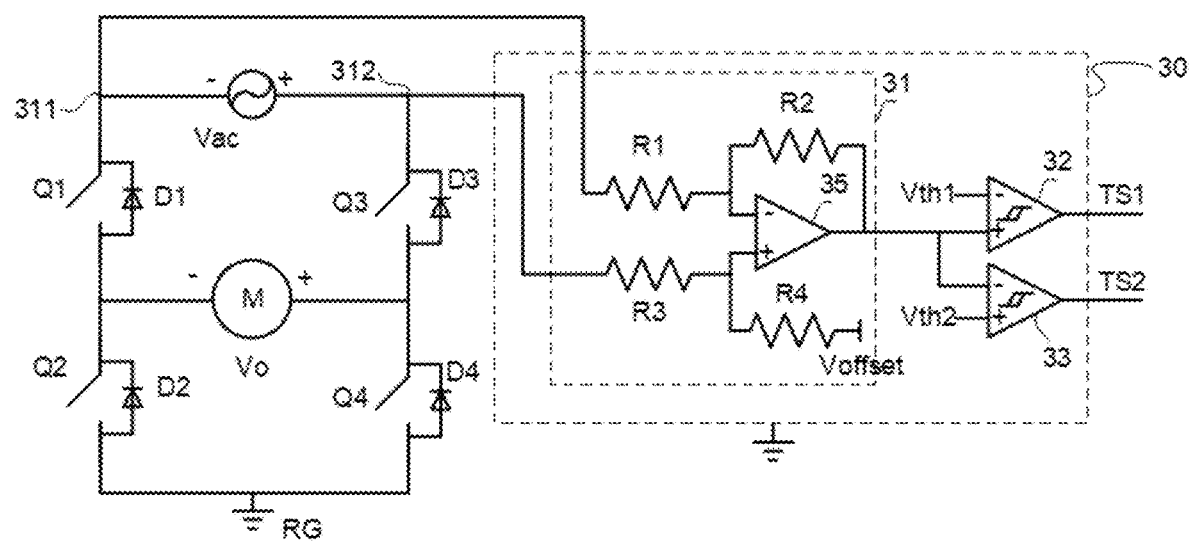
FIG. 4 illustrates a schematic diagram of a synchronizing signal generating circuit 30 according to certain embodiments of the present disclosure.

FIG. 4 illustrates a schematic diagram of a synchronizing signal generating circuit 30 according to certain embodiments of the present disclosure. In order to ensure mode switching among different working zones, it is necessary to obtain a signal indicative of the status of the AC power source Vac. The synchronizing signal generating circuit 30 has two input terminals, a reference terminal and two output terminals, wherein the two input terminals are coupled to the two output terminals of the AC power source Vac respectively, and the two output terminals provide a first synchronizing signal TS1 and a second synchronizing signal TS2 respectively. In the illustrated embodiment, the synchronizing signal generating circuit 30 comprises a differential amplifying circuit 31, a first comparing circuit 32 and a second comparing circuit 33. The first terminal and the second terminal of the AC power source Vac are floating ports.

According to some embodiments, with the operation of the differential amplifying circuit 31, the influence of the common mode signal of the AC power source is eliminated, and an offset AC signal relative to the reference terminal RG of the switching circuit and synchronizing with the input AC power source Vac is obtained, so as to facilitate the subsequent processing. In the illustrated embodiment, the differential amplifying circuit 31 has a first input, a second input, a bias terminal and an output, wherein the first input of the differential amplifying circuit 31 is coupled to the first input 311 of the switching circuit, the second input of the differential amplifying circuit 31 is coupled to the second input 312 of the switching circuit, the bias terminal of the differential amplifying circuit 31 receives a bias voltage Voffset based on the reference terminal RG of the switching circuit, and the output of the differential amplifying circuit 31 provides the bias AC signal.

In the shown embodiment, the differential amplifying circuit 31 comprises resistors R1-R4 and an operational amplifier 35, wherein the resistor R1 is coupled between the first input of the differential amplifying circuit 31 and the first input of the operational amplifier 35, the resistor R2 is coupled between the first input of the operational amplifier 35 and the output of the operational amplifier 35, the resistance R3 is coupled between the second input of the differential amplifying circuit 31 and the second input of the operational amplifier 35, and the resistance R4 is coupled between the second input of the operational amplifier 35 and the bias voltage Voffset. The output of the operational amplifier 35 provides a bias AC signal. When setting R1=R3 and R2=R4, the value of the bias AC signal is:

$$(V_{acp} - V_{acn})\frac{R_2}{R_1} + V_{offset}$$

where Vacp is the voltage at the second terminal of the AC power source and Vacn is the voltage at the first terminal of the AC power source.

In some examples, the non-inverting input of the first comparing circuit 32 is coupled to the output of the differential amplifying circuit 31, the inverting input of the first comparing circuit 32 is coupled to a first threshold signal Vth1, and the output of the first comparing circuit 32 provides the first synchronizing signal TS1. The inverting input of the second comparing circuit 33 is coupled to the output of the differential amplifying circuit 31, the non-inverting input of the second comparing circuit 33 is coupled to a second threshold signal Vth2, and the output of the second comparing circuit 33 provides a second synchronizing signal TS2. The first threshold signal Vth1 and the second threshold signal Vth2 can be voltage signals with reference to the reference terminal RG of the switching circuit as the reference ground.

The resistors R1-R4 can be replaced by other serial or parallel parasitic resistance.

Table 1 illustrates a status table of the first synchronizing signal TS1 and the second synchronizing signal TS2, with reference to the working status according to certain embodiments of the present disclosure.

TABLE 1

| TS1 | TS2 | Working Zone |
| --- | --- | --- |
| 0 | 0 | Dead zone |
| 1 | 0 | Positive half cycle |
| 0 | 1 | Negative half cycle |
| 1 | 1 | Fault |

Figure 5:
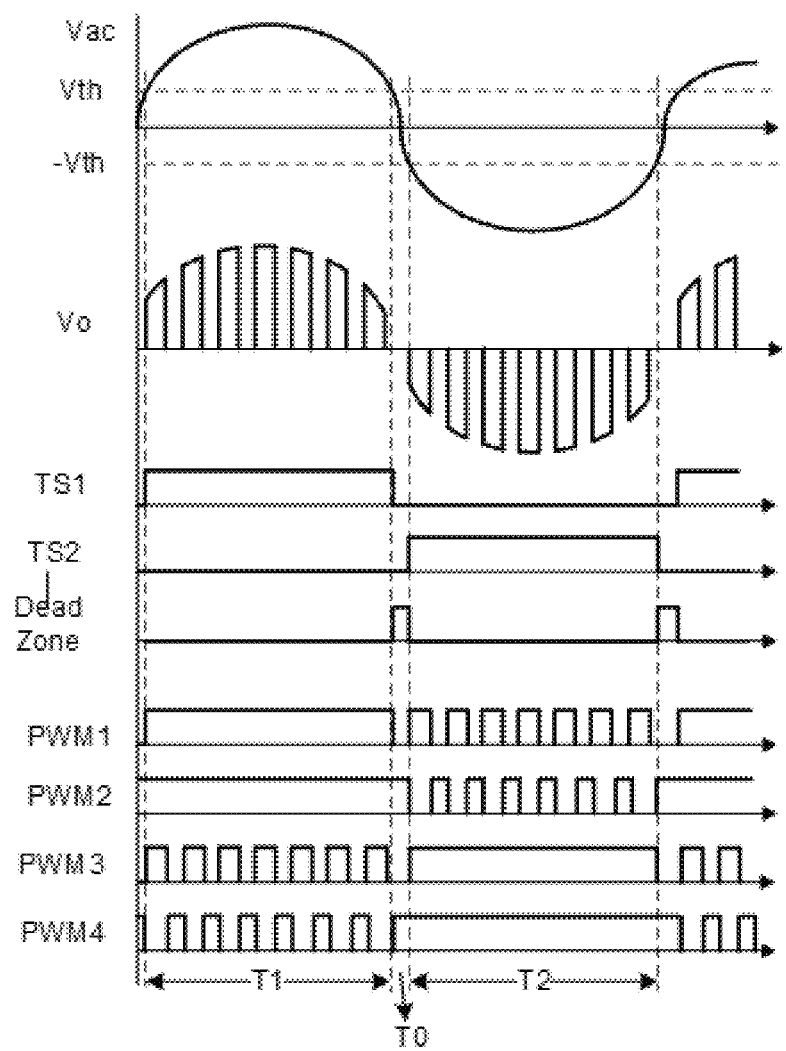
FIG. 5 illustrates a waveform diagram according to certain embodiments of the present disclosure.

FIG. 5 illustrates a waveform diagram according to certain embodiments of the present disclosure. The function of the AC chopping circuit will be described in combination with FIG. 3 and FIG. 4. The signals shown in FIG. 5 from top to bottom are the AC power source Vac, the AC chopping output voltage Vo, the first synchronizing signal TS1, the second synchronizing signal TS2, a dead zone signal and signals PWM-PWM4 representing the switching states of the four switches or the states of their switching control signals respectively. According to the polarity of the input AC power source Vac, the AC chopping scheme is divided into three working zones, namely the positive half cycle working zone T1, the negative half cycle working zone T2 and the dead zone T0. The working zones can be indicated by the first synchronizing signal TS1 and the second synchronizing signal TS2. In one embodiment, the working period when the input voltage Vac is higher than the first comparing threshold Vth is defined as the positive half cycle working zone T1, the working period when the input voltage Vac is lower than the first comparing threshold Vth and higher than the second comparing threshold—Vth is defined as the dead zone T0, and the working period when the input voltage is lower than the second comparing threshold—Vth is defined as the negative half cycle working zone T2.

In the positive half cycle working zone T1, the AC power source is in the positive half cycle (Vac>0), and the voltage at the first input terminal 211 of the switching circuit is less than the voltage at the second input terminal 212 of the switching circuit. At this time, signals PWM1 and PWM2 are in high level, signal PWM3 is a PWM signal with a second frequency, and signal PWM4 is a PWM signal complementary to signal PWM3, wherein the second frequency is greater than the first frequency of the AC power source Vac.

According to some embodiments, the switch driving circuit controls that the first bridge arm comprising the first switching transistor Q1 and the second switching transistor Q2 are turned on, the second bridge arm are chopped in complementary pattern such that the third switching transistor Q3 performs switching action with a duty cycle under the control of the PWM signal, and the fourth switching transistor Q4 works in a rectification state which is complementary to the switching action of the third switching transistor Q3, that is, when the third switching transistor Q3 is turned on, the fourth switching transistor Q4 is turned off and when the third switch Q3 is off, the fourth switching transistor Q4 is on.

In one embodiment, the control signal at the control terminal of the fourth switch Q4 is at a low value, and the fourth switch Q4 conducts through its body diode, so that the fourth switch Q4 works in non-synchronous rectification state. In another embodiment, the control signal at the control terminal of the fourth switch Q4 is a PWM control signal which is complementary to the signal at the control terminal of the third switch Q3, so that the fourth switch Q4 works in synchronous rectification state.

In the negative half cycle working zone T2, the AC power source Vac is in the negative half cycle (Vac<0), and the voltage at the first input terminal 211 of the switching circuit is greater than the voltage at the second input terminal 212 of the switching circuit. At this time, the control signals PWM3 and PWM4 are in high level, the PWM1 signal is a PWM signal with the second frequency, and the PWM2 signal is a PWM signal complementary to the PWM1 signal. The switch driving circuit turns on the second bridge arm including the third switching transistor Q3 and the fourth switching transistor Q4. Under the control of the PWM signal, the first switch Q1 of the first bridge arm switches with a duty cycle, and the second switch Q2 works in the rectification state, which is complementary to the switching action of the first switch Q1.

Via the above control, the voltage difference between the first output terminal 213 and the second output terminal 214 of the switching circuit, that is, the output voltage Vo of the switching circuit is presented as an AC chopping signal, which has the second frequency and the duty cycle corresponding to the PWM signal controlling the third switch Q3 or the first switch Q1, and the shape of the envelope line of the AC chopping signal Vo follows the waveform shape of the AC power source Vac. Accordingly, at the output terminals of the switching circuit, a voltage signal having an envelope line the same as the input voltage waveform and having an average amplitude proportional to the duty cycle is applied to the load M. Therefore, by this control, the output voltage Vo can be adjusted by changing the duty cycle of the PWM signals, so that the motor can realize stepless speed regulation. At the same time, because the envelope line of the output voltage Vo corresponds to the shape of the AC power source, the system has a high power factor.

The dead zone T0 is set during when the AC power source Vac is in its switching state, that is, in the period between the positive half cycle working zone T1 and the negative half cycle working zone T2. At dead zone T0, at least two switches in the switching transistors Q1-Q4 are turned off, but at the meantime the switching transistors Q1-Q4 cannot be turned off at the same time, otherwise the inductive load will induce high-voltage which may breakdown the switching transistors, and moreover, the current waveform may be easily distorted, which will affect the Total Harmonic Distortion (THD). Therefore, it is necessary to provide appropriate driving signals for forming a current loop for the inductive load. The switch driving circuit controls one or two switches in the first switch Q1, the second switch Q2, the third switch Q3 and the fourth switch Q4 to be on. In the embodiment as shown in the figure, during the dead zone T0, the switch driving circuit controls the second switching transistor Q2 and the fourth switching transistor Q4 to turn on, the first switching transistor Q1 and the third switching transistor Q3 to turn off, and a current loop is formed through the load M and the reference terminal RG.

In another embodiment, during the dead zone T0, the switch driving circuit controls the first switching transistor Q1 and the second switching transistor Q2 to turn on and the third switching transistor Q3 and the fourth switching transistor Q4 to turn off, or the third switching transistor Q3 and the fourth switching transistor Q4 to turn on and the first switching transistor Q1 and the second switching transistor Q2 to turn off. The output of the bridge arm in on state is clamped at the electrical potential of the reference terminal RG of the switching circuit, and the two switches of the other bridge arm are turned off. The residual current of the inductive load will force the body diode of one of the switching transistors of the bridge arm in off state to turn on, forming a freewheeling circuit to allow forming a current loop.

In yet another embodiment, during the dead zone T0, the switch driving circuit controls the first switch Q1 and the third switch Q3 to turn on, the second switch Q2 and the fourth switch Q4 to turn off, and a freewheeling circuit is formed between the AC power source Vac and the load M.

Figure 6:
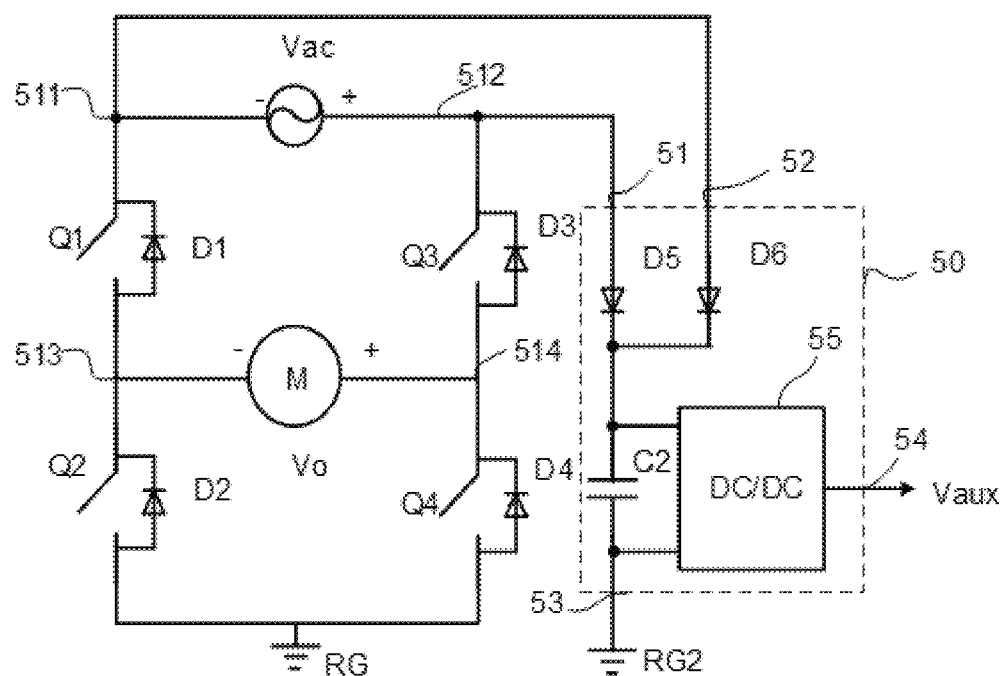
FIG. 6 illustrates a schematic diagram of an auxiliary power supplying circuit according to certain embodiments of the present disclosure.

FIG. 6 illustrates a schematic diagram of an auxiliary power supplying circuit 50 according to certain embodiments of the present disclosure. The auxiliary power supplying circuit 50 has a first input terminal 51, a second input terminal 52, a reference terminal 53 and an output terminal 54, wherein the first input terminal 51 and the second input terminal 52 of the auxiliary power supplying circuit 50 are coupled to the first input terminal 511 and the second input terminal 512 of the switching circuit respectively, and the output terminal 54 of the auxiliary power supplying circuit 50 provides an auxiliary power Vaux for supplying power to the switch driving circuit and the synchronizing signal generating circuit.

The reference terminal RG2 of the auxiliary power supplying circuit 50 is coupled to the reference terminal RG of the switching circuit to form a current loop between the first input terminal 51 of the auxiliary power supplying circuit

50, the reference terminal RG2 of the auxiliary power supplying circuit, the switching circuit and the AC power source Vac.

The auxiliary power supplying circuit 50 comprises: a fifth diode D5, the anode of which is coupled to the second input terminal 512 of the switching circuit; a sixth diode D6, the anode of which is coupled to the first input terminal 511 of the switching circuit; a second capacitor C2, the first terminal of which is coupled to the cathode of the fifth diode D5 and the cathode of the sixth diode D6, and the second terminal of which is coupled to the reference terminal RG of the switching circuit through the reference terminal RG2; and a voltage converting circuit 55 having a first input, a second input and an output, wherein the first input of the voltage converting circuit 55 is coupled to the cathode of the fifth diode d5 and/or the cathode of the sixth diode D6, the second input of the voltage converting circuit 55 is coupled to the reference terminal RG of the switching circuit, and the output of the voltage converting circuit 55 provides an auxiliary power Vaux. The voltage converting circuit 55 may comprise a linear LDO (Low Drop Out circuit) or a DC-DC (Direct Current to Direct Current) switching mode voltage converting circuit, such as a buck circuit, a boost circuit or a buck-boost circuit.

As shown in the figure, when the AC power source Vac is in the positive half cycle, the input AC power source supplies power at the input of the DC/DC converting circuit 55 through the fifth diode D5 of the auxiliary power supplying circuit 50, the common reference terminal RG2, and the switches Q2 and Q1 in the switching circuit. When the AC power source Vac is in the negative half cycle, it forms a current loop through the sixth diode D6 of the auxiliary power supplying circuit, the common reference terminal RG2, and the switches Q4 and Q3 of the switching circuit together with the AC power source Vac to supply power at the input of the DC/DC converting circuit 55.

When the system is initially powered on, the body diodes D1, D2, D3, D4 in the four main switches and the diodes D5 and/or D6 of the auxiliary power supplying circuit form a rectifying bridge. In the positive half cycle, it forms a current loop to supply power at the input of the DC/DC converting circuit 55 through the fifth diode D5 of the auxiliary power supplying circuit 50, the common reference terminal RG2, the body diodes D2 and D1 together with the AC power source Vac. In the negative half cycle, the AC power source Vac supplies power to the DC/DC converting circuit of the auxiliary power supplying circuit through the sixth diode D6 of the auxiliary power supplying circuit, the common reference terminal RG2, and the body diodes D4 and D3 of the switching circuit.

Moreover, by coupling the reference ground RG2 of the auxiliary power supplying circuit to the reference terminal RG of the switching circuit, when all the switches in the switching circuit are turned off, the current in the inductive load M can still flow through the current loop formed by the body diodes of the switching circuit and the auxiliary power supplying circuit 50. For example, when the switches Q1-Q4 are all in off state, if the current in the inductive load M flows out of the second output terminal 514, a freewheeling circuit for forming current loop is formed which comprises the body diode D3, the body diode D5, the reference terminal RG2 and the body diode D2; and if the current in the inductive load flows out of the first output terminal 513, a freewheeling circuit is formed which comprises the body diode D1, the body diode D6, the reference terminal RG2 and the body diode D4, so as to reduce the voltage spike and avoid damaging the switching circuit under the extreme condition of turning off all the switches of the switching circuit at the same time.

In another embodiment, the auxiliary power supplying circuit 50 may not include the sixth diode D6, and the auxiliary power supplying circuit 50 is only powered by the AC power source Vac in the positive half cycles of the AC power source Vac.

In another embodiment, the auxiliary power supplying circuit may not include the second capacitance C2, and the AC power source directly supplies power to DC/DC converting circuit 55 for further generating auxiliary power Vaux. In one embodiment, the second capacitance C2 is part of the voltage converting circuit 55, or the second capacitance C2 is replaced by other forms of energy storage devices.

Figure 7:
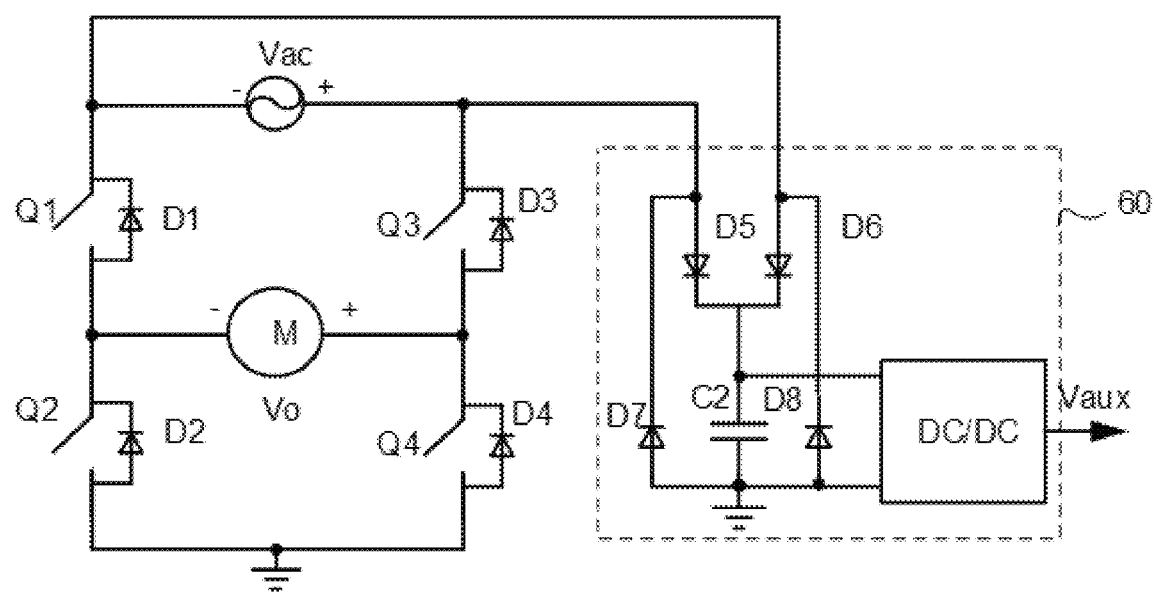
FIG. 7 illustrates a schematic diagram of an auxiliary power supplying circuit according to certain embodiments of the present disclosure.

FIG. 7 shows a schematic diagram of an auxiliary power supplying circuit 60 according to certain embodiments of the present disclosure. Compared with the auxiliary power supplying circuit 50 in FIG. 6, the auxiliary power supplying circuit 60 further comprises a bypass device: a seventh diode D7, the anode of which is coupled to the second input of the voltage converting circuit, wherein the first input of the voltage converting circuit is coupled to the cathode of the diode D5 or D6, and the cathode of D7 is coupled to the anode of the fifth diode D5. The auxiliary power supplying circuit 60 may further include a bypass device: an eighth diode D8, the anode of which is coupled to the second input of the voltage converting circuit, and the cathode of which is coupled to the anode of the sixth diode D6.

In one embodiment, the auxiliary power supplying circuit comprises diodes D5 and D8, and has neither diode D6 nor D7. In one embodiment, the auxiliary power supplying circuit comprises diodes D6 and D7, but has neither D5 nor D8. In one embodiment, the auxiliary power supplying circuit comprises diodes D5, D6, D7 and D8 at the same time. In these embodiments, it can form a current loop without coupling the reference ground terminal of the auxiliary power supplying circuit to the switching circuit. For example, in the positive half cycle of the AC power source, a current loop is formed through diode D5, capacitor C2 and diode D8; in the negative half cycle of AC power source, the current loop is formed through diode D6, capacitor C2 and diode D7.

In the embodiment shown in FIG. 7, although four diodes D5-D8 are introduced into the auxiliary power supplying circuit 60, due to the low current required by the auxiliary power supplying circuit 60, compared with the rectifying bridge scheme coupled between the input AC power source Vac and the switching circuit, the power of the diodes in the auxiliary power supplying circuit is greatly reduced, and the requirements of the parameters of diodes D5-D8 are also reduced.

Figure 8:
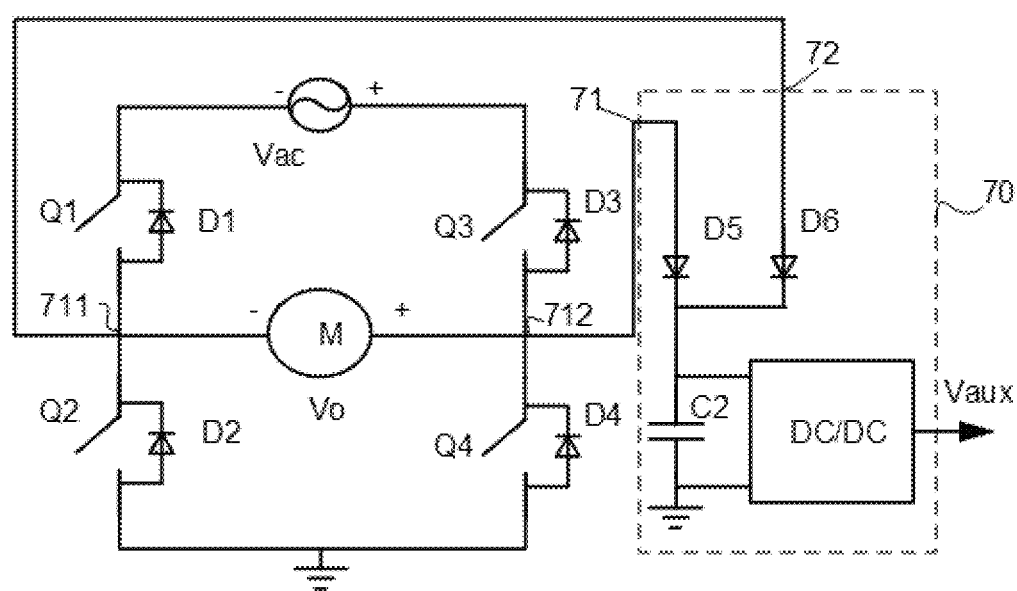
FIG. 8 illustrates a schematic diagram of an auxiliary power supplying circuit according to certain embodiments of the present disclosure.

FIG. 8 illustrates a schematic diagram of an auxiliary power supplying circuit 70 according to certain embodiments of the present disclosure. Compared with the embodiment in FIG. 6, the first input terminal 71 and/or the second input terminal 72 of the auxiliary power supplying circuit 70 are coupled to the first output terminal 711 and/or the second output 712 of the switching circuit respectively. The auxiliary power supplying circuit 70 obtains power from the output(s) of the switching circuit.

Figure 9:
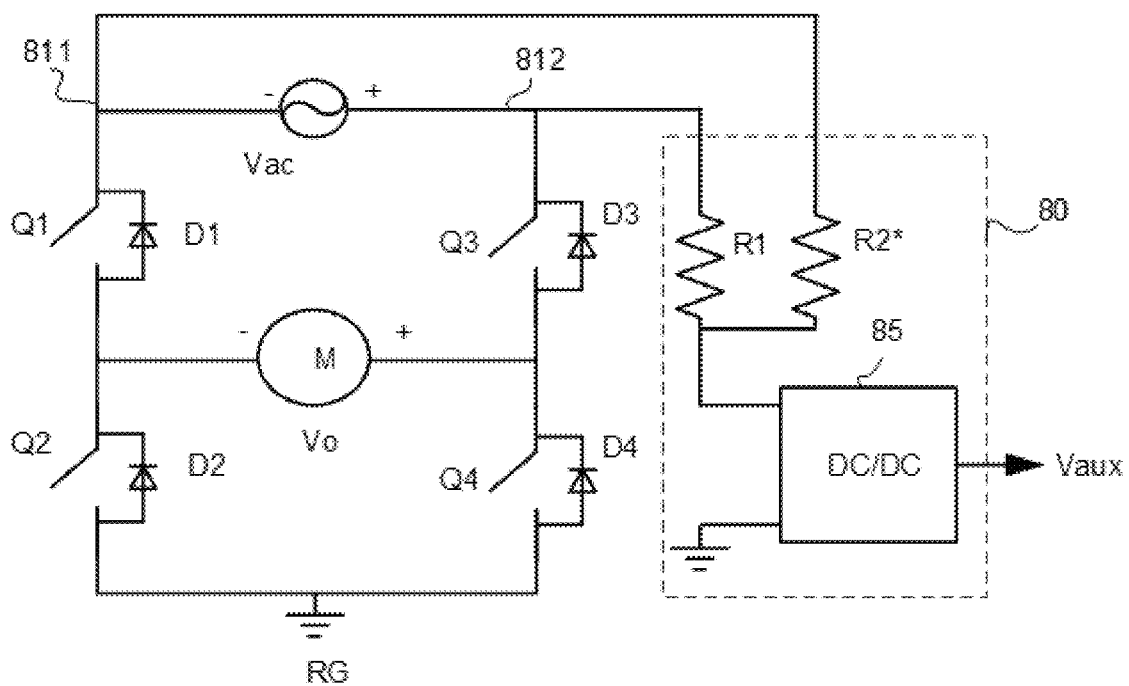
FIG. 9 illustrates a schematic diagram of an auxiliary power supplying circuit according to certain embodiments of the present disclosure.

FIG. 9 illustrates a schematic diagram of an auxiliary power supplying circuit 80 according to yet certain embodiments of the present disclosure. The auxiliary power supplying circuit 80 comprises: a first resistance R1, a first terminal of which is coupled to the second input terminal 812 of the switching circuit, and/or, a second resistance R2, a first terminal of which is coupled to the first input terminal 811 of the switching circuit; and a voltage converting circuit 85 having a first input, a second input and an output, wherein the first input of the voltage converting circuit 85 is coupled to a second terminal of the first resistor R1 and/or a second terminal of the second resistor R2, the second input of the voltage converting circuit 85 is coupled to the reference terminal RG of the switching circuit, and the output of the voltage converting circuit 85 provides the auxiliary power Vaux.

By coupling the reference ground of the auxiliary power supplying circuit to the reference terminal RG of the power supply circuit, the power can be obtained from the input(s) or output(s) of the switching circuit. By using the body diodes of the switches in the switching circuit, a current loop is formed for the auxiliary power supplying circuit, which simplifies the design and cost of the auxiliary power supplying circuit.

It should be known to those skilled in the art that the logic controls of "high level" and "low level", "non-inverting input" and "inverting input" in the above logic controls can be exchanged or changed with each other, and the same function or purpose as the above embodiment can be achieved by adjusting the subsequent logic control.

Figure 10:
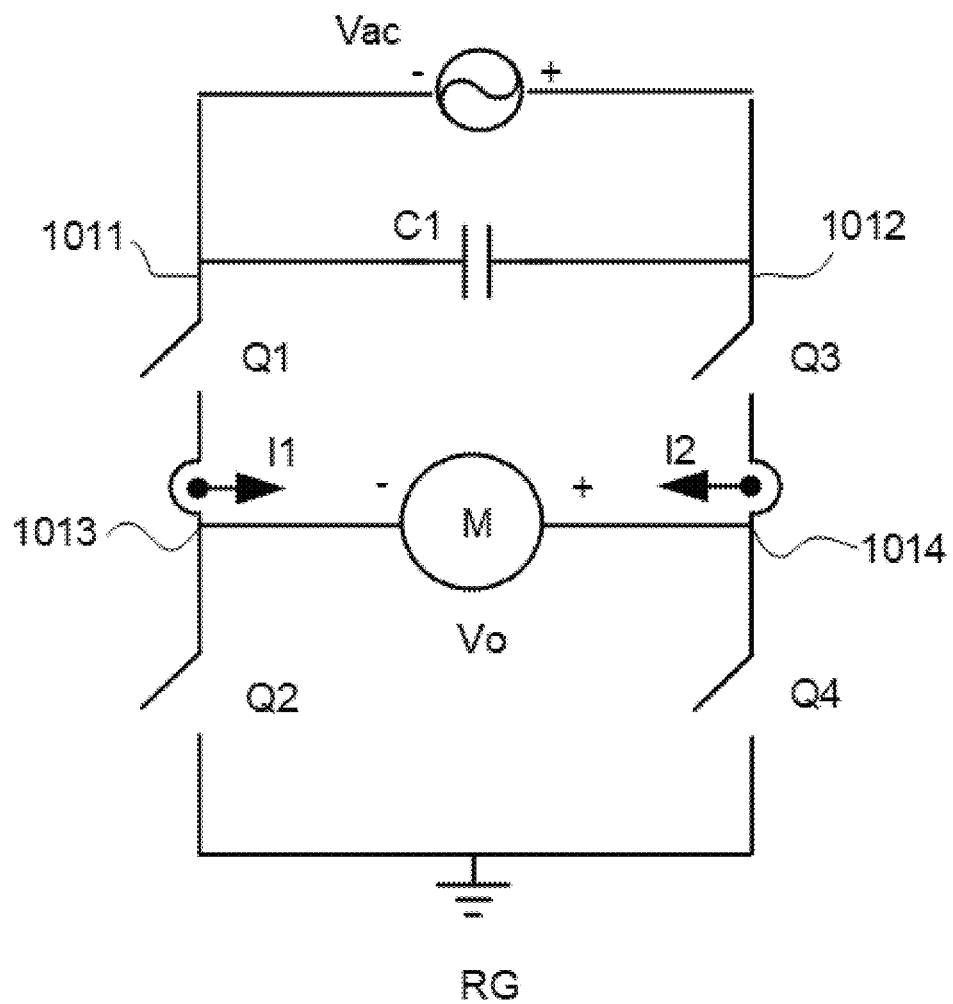
FIG. 10 illustrates a schematic diagram of a current sensing method for an AC chopping circuit according to an example of the present disclosure.

FIG. 10 shows a schematic diagram of a current sensing method for an AC chopping circuit according to certain embodiments of the present disclosure. The AC chopping circuit comprises a switching circuit. The switching circuit has a first input terminal 1011, a second input terminal 1012, a first output terminal 1013 and a second output terminal 1014, wherein the first input terminal 1011 is coupled to a first end of an AC power source Vac, the second input terminal 1012 is coupled to a second end of the AC power source Vac, the first output terminal 1013 is coupled to a first end of an AC load M, and the second output terminal 1014 is coupled to a second end of the AC load M.

The AC power source Vac supplies power of alternating polarities. In one example, the AC power source Vac is a commercial AC power source, such as a 220 V/50 Hz sine wave AC voltage source. In one example, the AC power source further comprises a capacitor C1 and/or an electromagnetic interference (EMI) filter circuit coupled between two ends of the AC voltage source for filtering spike signals of high frequency. A switching circuit 11 receives an AC signal Vac of alternating polarities, and is used to drive the AC load M at the output terminals 1013 and 1014.

In one example, the AC load comprises a single-phase AC motor.

By controlling the state of switching transistors Q1-Q4 in the switching circuit, the input AC power source Vac is subjected to AC chopping, and thus an AC chopping signal is provided at the output terminals of the switching circuit for supplying power to the load M.

According to some embodiments, the switching circuit comprises: a first switching transistor Q1 coupled between the first input terminal 1011 of the switching circuit and the first output terminal 1013 of the switching circuit, a second switching transistor Q2 coupled between a reference terminal RG of the switching circuit and the first output terminal 1013 of the switching circuit, a third switching transistor Q3 coupled between the second input terminal 1012 of the switching circuit and the second output terminal 1014 of the switching circuit, and a fourth switching transistor Q4 coupled between the reference terminal RG of the switching circuit and the second output terminal 1014, wherein each switching transistor comprises a body diode connected in parallel.

According to certain embodiments, the first switching transistor Q1 comprises a first body diode D1 connected in parallel, wherein an anode of the first body diode D1 is coupled to the first output terminal 1013 of the switching circuit, and a cathode of the first body diode D1 is coupled to the first input terminal 1011 of the switching circuit. The second switching transistor Q2 comprises a second body diode D2 connected in parallel, wherein an anode of the second body diode D2 is coupled to the reference terminal RG of the switching circuit, and a cathode of the second body diode D2 is coupled to the first output terminal 1013 of the switching circuit.

The third switching transistor Q3 comprises a third body diode D3 connected in parallel, wherein an anode of the third body diode D3 is coupled to the second output terminal 1014 of the switching circuit, and a cathode of the second body diode D2 is coupled to the second input terminal 1012 of the switching circuit. The fourth switching transistor Q4 comprises a fourth body diode D4 connected in parallel, wherein an anode of the fourth body diode D4 is coupled to reference terminal RG of the switching circuit, and a cathode of the fourth body diode D4 is coupled to the second output terminal 1014 of the switching circuit.

The switching transistors Q1-Q4 may comprise field effect transistors, such as Metal Oxide Semiconductor Field Effect Transistors (MOSFETs), Junction Field Effect Transistors (JFETs), or Insulated Gate Bipolar Transistors (IGBTs). In some examples, the switching transistors Q1-Q4 comprise parasitic body diodes for achieving non-synchronous freewheeling. In another example, the switching transistors Q1-Q4 may each be connected in parallel with a discrete diode. Each of the switching transistors Q1-Q4 may be individually replaced by a combination of a plurality of switching transistors or a combination of a switching transistor and a diode. In some examples, Q2, Q4 include FRD MOSFET (e.g., MOSFET with fast recovery diode) and Q1, Q3 include regular MOSFET. In certain examples, when the load (e.g., motor M) is almost purely resistive such that most of the time Q2 and Q4 works in rectifier mode (i.e., when body diode is conducting), and Q1 and Q3 works in active mode (i.e., when body diode is not conducting). In some variations, with Q1 and Q3 including MOSFETs and Q2 and Q4 including FRD MOSFETs, the reverse recovery effect is not apparent, and the relevant reverse recovery loss is acceptable. As an example, Q2 and Q4 each includes a fast recovery diode. For example, Q2 and Q4 each includes a fast recovery diode connected parallel with a transistor.

In other examples, the switching circuit may have other topologies, such as a bridgeless three-phase switching circuit, and the load may be a three-phase AC motor.

When the switching circuit operates in a positive half cycle working zone, the polarity of the AC power source is as shown in FIG. 10, the voltage of the first input terminal 1011 of the switching circuit is lower than that of the second input terminal 1012 of the switching circuit, the AC chopping circuit controls the first switching transistor Q1 and the second switching transistor Q2 to be turned on simultaneously, a second half-bridge driving circuit 233 controls the third switching transistor Q3 to perform switching operation at a duty cycle, the fourth switching transistor Q4 operates in a freewheeling state, and the fourth switching transistor Q4 can be in a synchronous rectification state (controlled to be turned on by a control end) or a non-synchronous rectification state (controlled to be turned on by the body diode D4).

When the switching circuit operates in a negative half cycle working zone, the voltage of the first input terminal 1011 of the switching circuit is greater than that of the second input terminal 1012 of the switching circuit, the AC chopping circuit controls the third switching transistor Q3 and the fourth switching transistor Q4 to be turned on simultaneously, the first switching transistor Q1 performs switching operation at a duty cycle, the second switching transistor Q2 operates in a freewheeling state, and the second switching transistor Q2 can be in a synchronous rectification state (controlled to be turned on by the control end) or non-synchronous freewheeling state (controlled to be turned on by the body diode D2).

In some embodiments, the switching circuit in the topology is directly coupled to the AC power source, and the AC power source is subjected to chopping by controlling the switching circuit for outputting an AC chopping signal, which leaves a high-power freewheeling circuit at the input unnecessary and improves power density and efficiency.

Under the topology and the operation mode, in some operation conditions, the two lower switching transistors Q2 and Q4 are used as freewheeling switching transistors, and only the two upper switching transistors Q1 and Q3 are what can indicate the current state when the power source supplies power. Therefore, the current value in the energy transfer stage can be accurately and directly indicated only by the current of the two upper transistors Q1 and Q3 that are directly connected to the power source, and thus the change of the current can be timely sensed and responded to, and the timely overcurrent or short-circuit protection of the system is realized.

In such an AC chopping circuit topology, in order to sense load current Io during the energy supply of the AC power source Vac, the current sensing method comprises sensing current flowing through the first switching transistor Q1 and/or sensing current flowing through the third switching transistor Q3. In some examples, the current flowing through the first switching transistor Q1 during the turned-on period of the first switching transistor Q1 is sensed, and/or the current flowing through the third switching transistor Q3 during the turned-on period of the third switching transistor Q3 is sensed.

In one example, the current I1 flowing through the first switching transistor Q1 is sensed by sensing voltage of the first input terminal 1011 relative to the first output terminal 1013 or the reference terminal RG, and the current I2 flowing through the third switching transistor Q3 is sensed by sensing voltage of the second input terminal 1012 relative to the second output terminal 1014 or the reference terminal RG.

Figure 11:
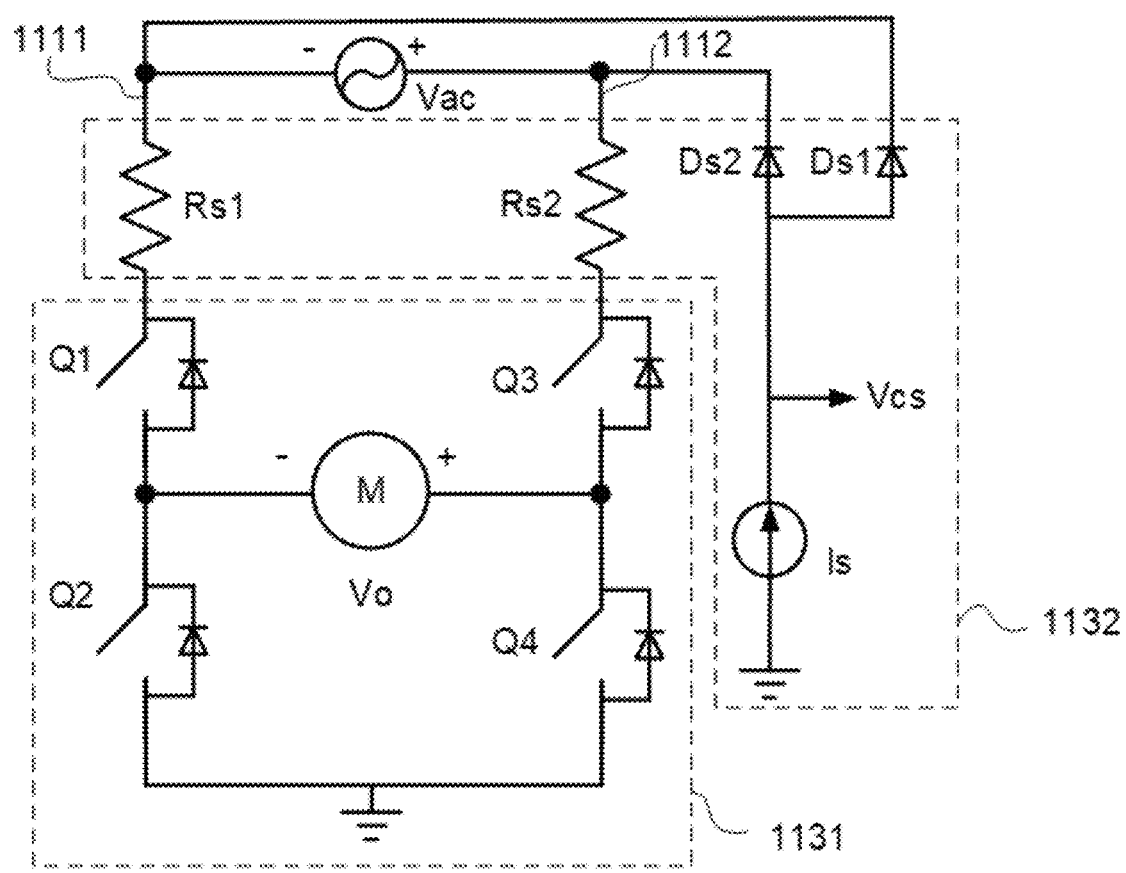
FIG. 11 illustrates a schematic diagram of an AC chopping circuit comprising a current sensing circuit according to an example of the present disclosure.

FIG. 11 shows a schematic diagram of an AC chopping circuit according to certain embodiments of the present disclosure for illustrating a current sensing method for the chopper circuit. The AC chopping circuit comprises a switching circuit 1131 and a current sensing circuit 1132. The current sensing circuit 1132 comprises a first sensing resistor Rs1, a second sensing resistor Rs2, a first diode Ds1, a second diode Ds2, and a current source Is, wherein the first sensing resistor Rs1 is connected in series with the first switching transistor Q1, and the second sensing resistor Rs2 is connected in series with the third switching transistor Q3.

In the illustrated example, the first sensing resistor Rs1 is coupled between a first input terminal 1111 and the first switching transistor Q1 of the switching circuit, although the positions of the first sensing resistor Rs1 and the switching transistor Q1 may be interchanged. A cathode of the first diode Ds1 is coupled to the first input terminal 1111 of the switching circuit 1131, an anode of the first diode Ds1 is coupled to an output of the current source Is, a cathode of the second diode Ds2 is coupled to a second input terminal 1112 of the switching circuit 1131, and an anode of the second diode Ds1 is also coupled to the output of the current source Is. The current source Is is for providing a bias current to turn on the diode Ds1 or Ds2, thus providing a voltage signal at the output of the current source Is as a current sensing signal Vcs. The operation mode of the AC chopping circuit and the current sensing method therefore will be described below with reference to the diagram of waveforms in FIG. 12.

Figure 12:
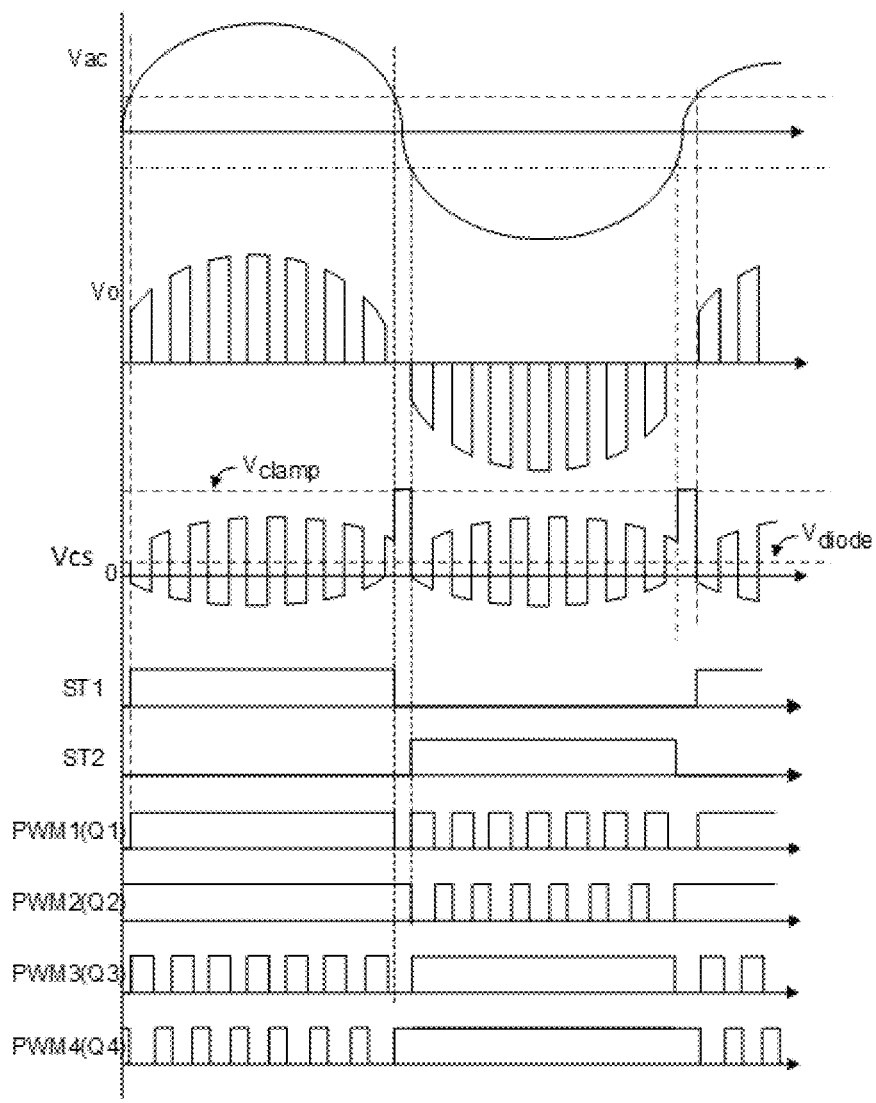
FIG. 12 illustrates a schematic diagram of waveforms according to certain embodiments of the present disclosure.

FIG. 12 shows a schematic diagram of waveforms according to certain embodiments of the present disclosure. A signal AC power source Vac, an output voltage Vo, a current sensing signal Vcs, a first synchronization signal ST1, a second synchronization signal ST2, and switching control signals PWM1-PWM4 are shown from top to bottom. The AC power source Vac is a sinusoidal AC signal and is applied between the first input and the second input of the switching circuit. The output voltage Vo is an AC chopping signal obtained by chopping the sinusoidal AC signal Vac, and it is a differential voltage between the first output and the second output of the switching circuit and is applied to both ends of the AC load.

The synchronization signals ST1 and ST2 are status signals related to the polarity of the AC power source Vac, wherein when the first synchronization signal ST1 is at high level, the voltage at the first input of the switching circuit is lower than that at its second input, indicating that the switching circuit is operating in the positive half cycle working zone; when the second synchronization signal ST2 is at high level, the voltage at the first input of the switching circuit is greater than that at its second input, indicating that the switching circuit is operating in the negative half cycle working zone; when the signals ST1 and ST2 are both at low level, it is indicated that the switching circuit is operating in the dead zone operation interval. In one example, the definition of the operation interval may be generated by comparison between the input voltage Vac and two threshold voltages or the zero crossing point phase of voltage.

According to some embodiments, taking the method involving comparison with two threshold voltages as an example, an operation time period during which the input voltage Vac is higher than a first comparison threshold (positive) is defined as a positive half cycle working zone, an operation time period during which the input voltage is lower than the first comparison threshold but higher than a second comparison threshold (negative) is defined as a dead zone operation interval, and an operation interval in which the input voltage Vac is lower than the second comparison threshold is defined as a negative half cycle working zone. The switching control signals PWM1-PWM4 are switching control signals for driving the switching transistors Q1-Q4. When a switching control signal is at high level, a corresponding switching transistor is controlled to be turned on. When a switching control signal is at low level, a corresponding switch does not form a channel and the switch is cut off, but a parasitic body diode of the switch may enable one-way passing of current.

According to certain embodiments, the positive half cycle working zone, the synchronization signal ST1 is at high level, the voltage at the second input terminal 1112 of the AC power source is greater than that at its first input terminal

1111, that is, the voltage at the second input terminal 1112 is positive relative to the reference terminal, and the voltage at the first input terminal 1111 is negative. At this time, the signals PWM1 and PWM2 are at high level, the switching transistors Q1 and Q2 are turned on, the signal PWM3 is a pulse width modulation signal and makes the switching transistor Q3 perform switching operation at a duty cycle, and the fourth switching transistor Q4 operates in synchronous freewheeling or non-synchronous freewheeling, and is complementary to the switching operation of the third switching transistor Q3.

According to some embodiments, during the working zone, the AC power source is applied, in a forward direction, to a right bridge arm shown, the right bridge arm performs switching operation at a given duty cycle (Q3), and a voltage signal having an envelope equal to the input voltage waveform and an average value in direct proportional to the duty cycle is generated at the output and applied to the load M in the forward direction. At this time, the third switching transistor Q3 is a main switching transistor, the fourth switching transistor Q4 is a freewheeling switch, and by this time, the fourth switching transistor Q4 may not need to supply a driving signal, and the current flows through the body diode.

When the third switching transistor Q3 is turned on, the current Io flows out the second input terminal 1112 of the AC power source Vac, through the Q3, the load M, the Q1 and the resistor Rs1, and to the first input terminal 1111 of the AC power source Vac. At this time, since Q1 and Q2 are turned on, the voltage at the first input terminal 1111 is Rs1*Io. At this point, the voltage at the first input terminal 1111 of the AC power source Vac is a negative voltage, the second diode Ds2 is turned on, the first diode Ds1 is cut off, and the sum of a sampling resistor voltage Rs1*Io and a fixed diode forward bias voltage (Vdiode) is conveyed to a current sampling output, so that the current sensing signal Vcs=Vdiode−Rs1*Io, where Vdiode is turned-on voltage drop of the diode Ds2 and is a constant value, such as 0.7 V, and the voltage Vcs takes the reference terminal RG as the reference ground. Vcs is therefore indicative of the current Io flowing through the load, and the current flowing through the first switching transistor Q1 is now sensed.

When the switching transistor Q3 is turned off, the current in the inductive load M forms a loop through the body diodes Q2 and Q4 which are turned on, and the voltage at the input terminal 1111 shows a voltage drop of Vq2 on Q2, and Vcs=Vq2+Vdiode.

In the negative half cycle working zone, the synchronization signal ST2 is at high level, the signals PWM3 and PWM4 are at high level, the switching transistors Q3 and Q4 are turned on, the signal PWM1 is a pulse width modulation signal and makes the switching transistor Q1 perform switching operation at a duty cycle, and the switching transistor Q2 operates in synchronous freewheeling or non-synchronous freewheeling, and is complementary to the switching operation of the switching transistor Q1. The first diode Ds1 is now turned on.

When the switching transistor Q1 is turned on, the current Io flows out the first input terminal 1111 of the AC power source Vac, through the Q1, the load M, the Q3 and the resistor Rs2, and to the second input terminal 1112 of the AC power source Vac. The current sensing circuit senses the current flowing through the switching transistor Q3, and obtains a current sensing signal Vcs=Vdiode−Rs2*Io, with the reference terminal RG as the reference ground. By fixed values of Rs1 and Rs2, Vcs can indicate the current Io flowing through the load. When the switching transistor Q3 is turned off, the current in the inductive load M forms a loop through the body diodes Q2 and Q4 which are turned on, and the voltage at the first input terminal 1111 shows a voltage drop of Vq2 on Q2, and Vcs=Vq2+Vdiode.

In the dead zone operation interval, the two switching transistors Q2 and Q4 close to the reference terminal RG can be turned on, the two switching transistors Q1 and Q3 corresponding to the input terminals are turned off, and thus the inductive load and the reference terminal form a freewheeling circuit. In the dead zone operation interval, the two upper transistors are in the off state, the two sensing diodes Ds1 and Ds2 shown in FIG. 11 are cut off, and the Vcs voltage is clamped at a higher fixed voltage (Vclamp).

Figure 13:
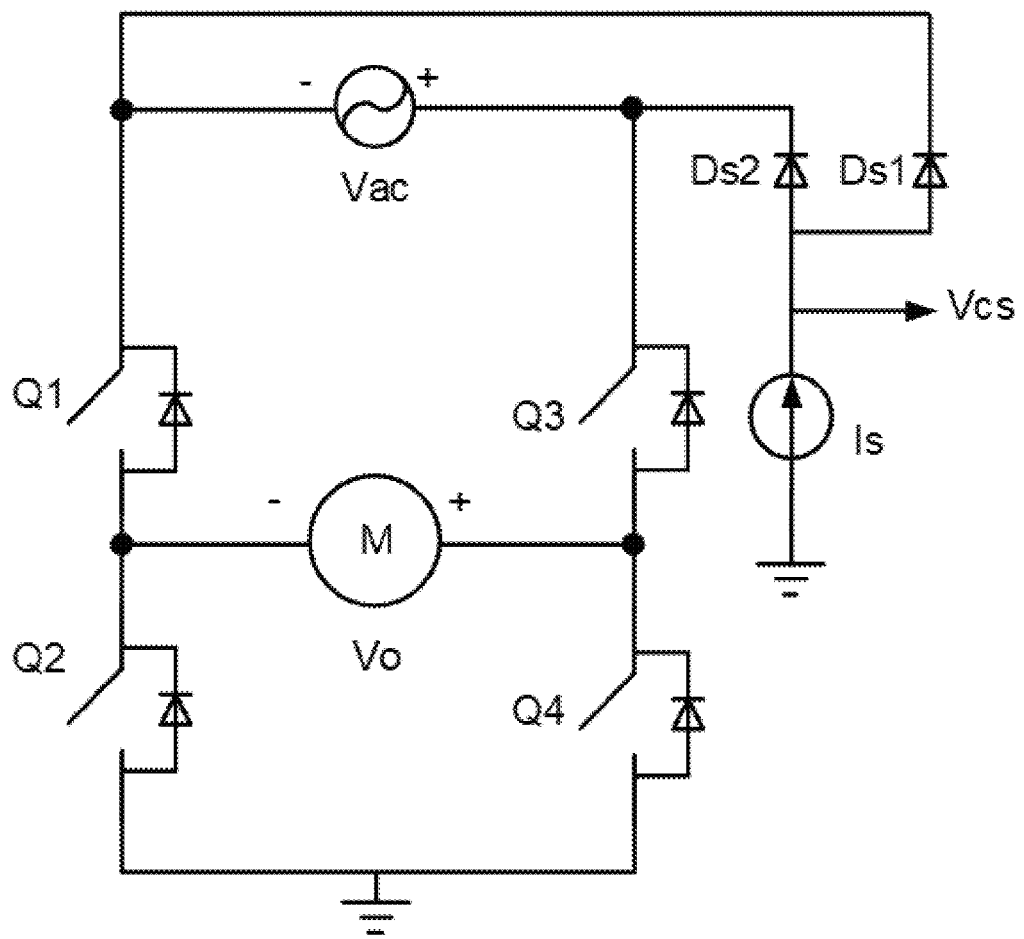
FIG. 13 illustrates a schematic diagram of an AC chopping circuit according to certain embodiments of the present disclosure.

FIG. 13 illustrates a schematic diagram of an AC chopping circuit according to certain embodiments of the present disclosure. A current sensing circuit comprises a first diode Ds1, a second diode Ds2, and a current source Is. Compared with the example shown in FIG. 11, in this example, a first sensing resistor in the current sensing circuit indicates an on-resistant equivalent resistor of a first switching transistor Q1, such as a channel resistance or a body diode resistance, and a second sensing resistor Rs2 indicates an on-resistant equivalent resistor of a third switching transistor Q3. In this example, voltage difference between two ends of the first switching transistor Q1 or the third switching transistor Q3 when turned on varies with a load current Io, and therefore the load current Io can be indicated by the voltage difference. The voltage difference of Q1 or Q3 when turned on can be indicated by a voltage value of a current sensing signal Vcs.

Figure 14A:
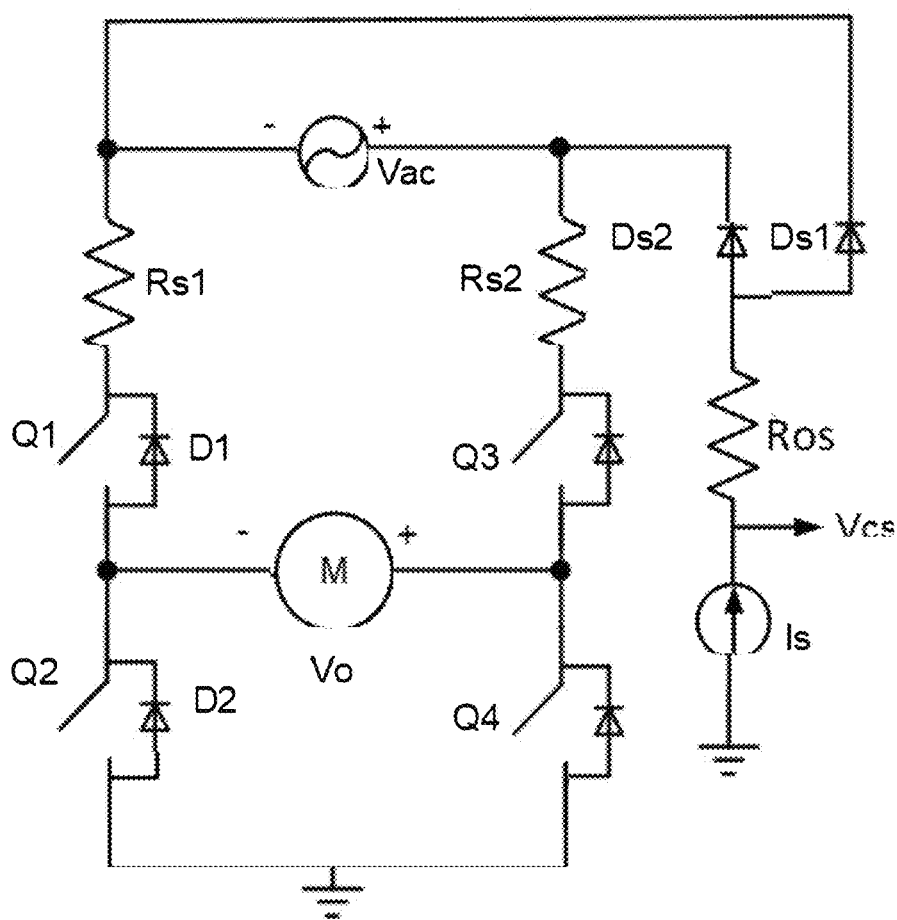
FIG. 14A illustrates a schematic diagram of an AC chopping circuit according to certain embodiments of the present disclosure.

FIG. 14A illustrates a schematic diagram of an AC chopping circuit according to certain embodiments of the present disclosure. Compared with the example of FIG. 11, a current sensing circuit in this example further comprises a bias resistor Ros, a first end of which is coupled to an output of a current source Is and a second end of which is coupled to anodes of a first diode Ds1 and a second diode Ds2, wherein the output of the current source Is provides a current sensing signal Vcs. At this time, in the positive half cycle working zone, when a switching transistor Q3 is turned on, the current sensing signal Vcs=Vdiode+Ros*Is−Rs1*Io. In the negative half cycle working zone, when a Q1 is turned on, the current sensing signal Vcs=Vdiode+Ros*Is−Rs2*Io. When the current sensing signal is used for comparison with a preset current threshold signal to further control the switching circuit, a resistance value of the bias resistor Ros can be selected to adjust current control level, e.g., to adjust an overcurrent protection point.

Figure 14B:
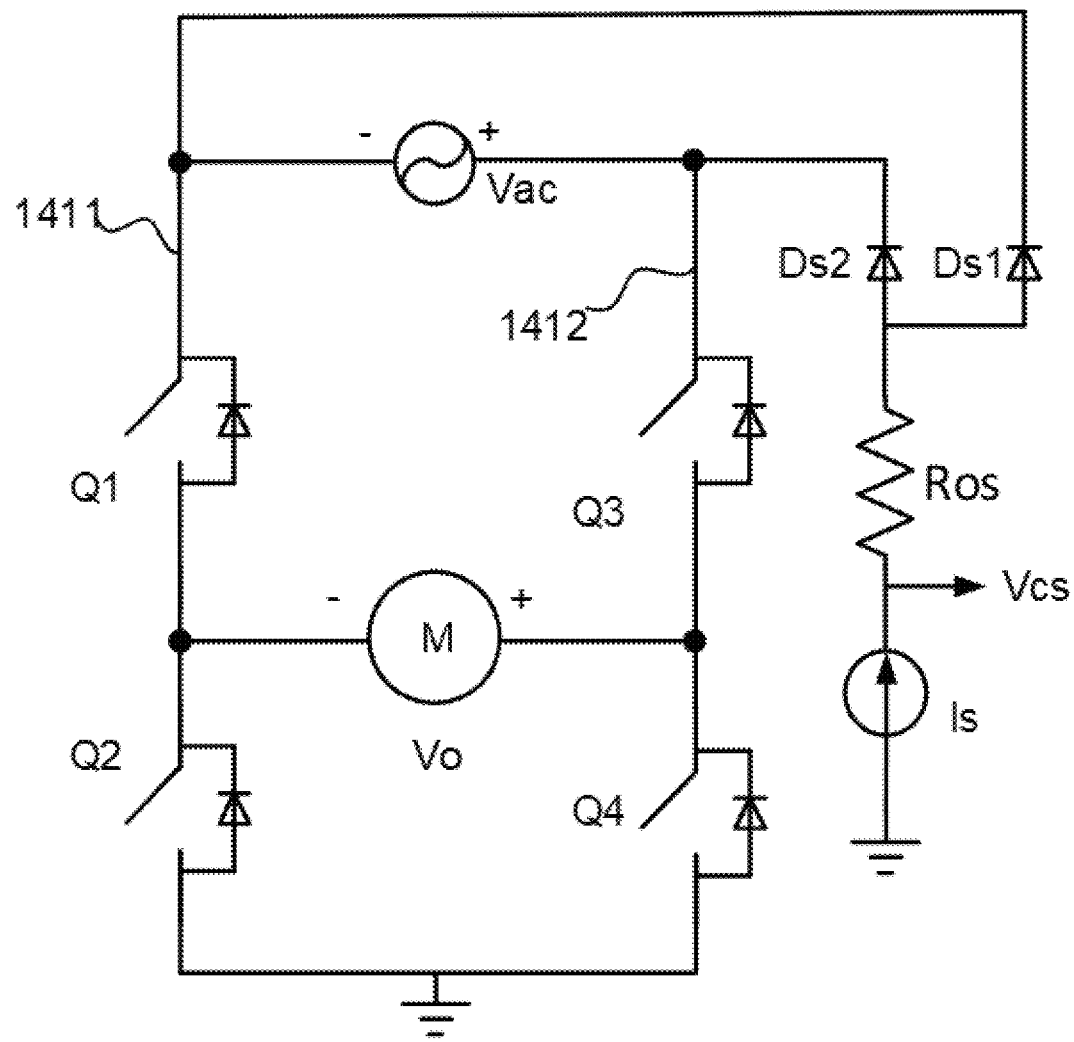
FIG. 14B illustrates a schematic diagram of an AC chopping circuit according to another manifestation of certain embodiments of the present disclosure.

FIG. 14B illustrates a schematic diagram of an AC chopping circuit according to certain embodiments of the present disclosure. As shown in FIG. 14A, a current sensing circuit comprises a first sensing resistor Rs1 and a second sensing resistor Rs2. In one example, the first sensing resistor Rs1 and the second sensing resistor Rs2 in FIG. 14A are additionally disposed resistor elements, and are connected in series with the first switching transistor Q1 and the third switching transistor Q3, respectively. In another example, instead of being additionally disposed resistor elements, the first sensing resistor Rs1 and the second sensing resistor Rs2 indicate on-resistant equivalent resistors of the first switching transistor Q1 and the third switching transistor Q3, respectively. In order to embody this feature, FIG. 14B shows another manifestation of one possible example of FIG. 14A, wherein the AC chopping circuit senses the voltage at a first input terminal 1411 based on the on-resistant equivalent resistor of the first switching transistor Q1, senses the voltage at a second input terminal 1412 based on the on-resistant equivalent resistor of the third switching transistor Q3, couples a cathode of the first diode Ds1 to the first input, couples a cathode of the second diode to the second input, and couples the output of the current source to the anode of the first diode and the anode of the second diode for providing a bias current such that the voltage at the output of the current source indicates load current.

Figure 15:
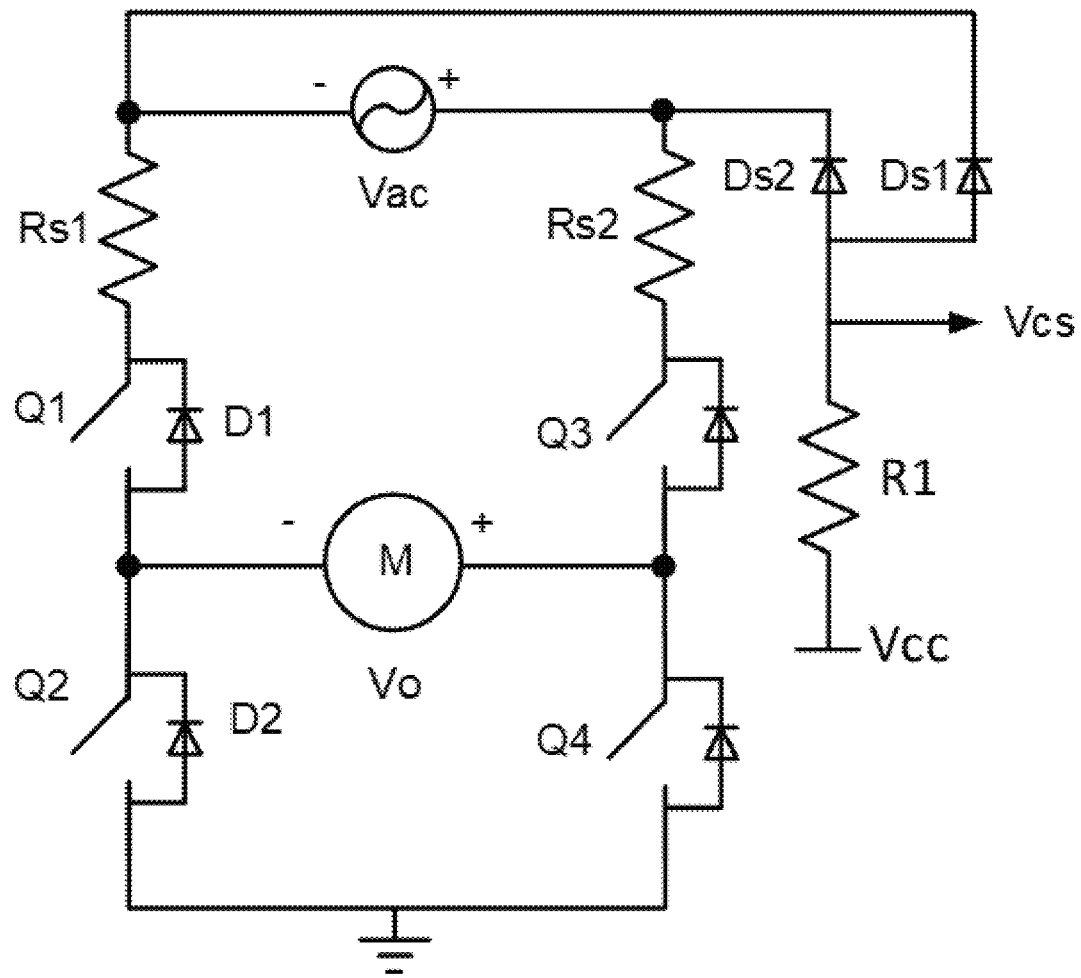
FIG. 15 illustrates a schematic diagram of an AC chopping circuit according to certain embodiments of the present disclosure.

FIG. 15 illustrates a schematic diagram of an AC chopping circuit according to certain embodiments of the present disclosure. Compared with the example of FIG. 11, a current source in this example comprises a voltage source Vcc and a resistor R1.

Figure 16:
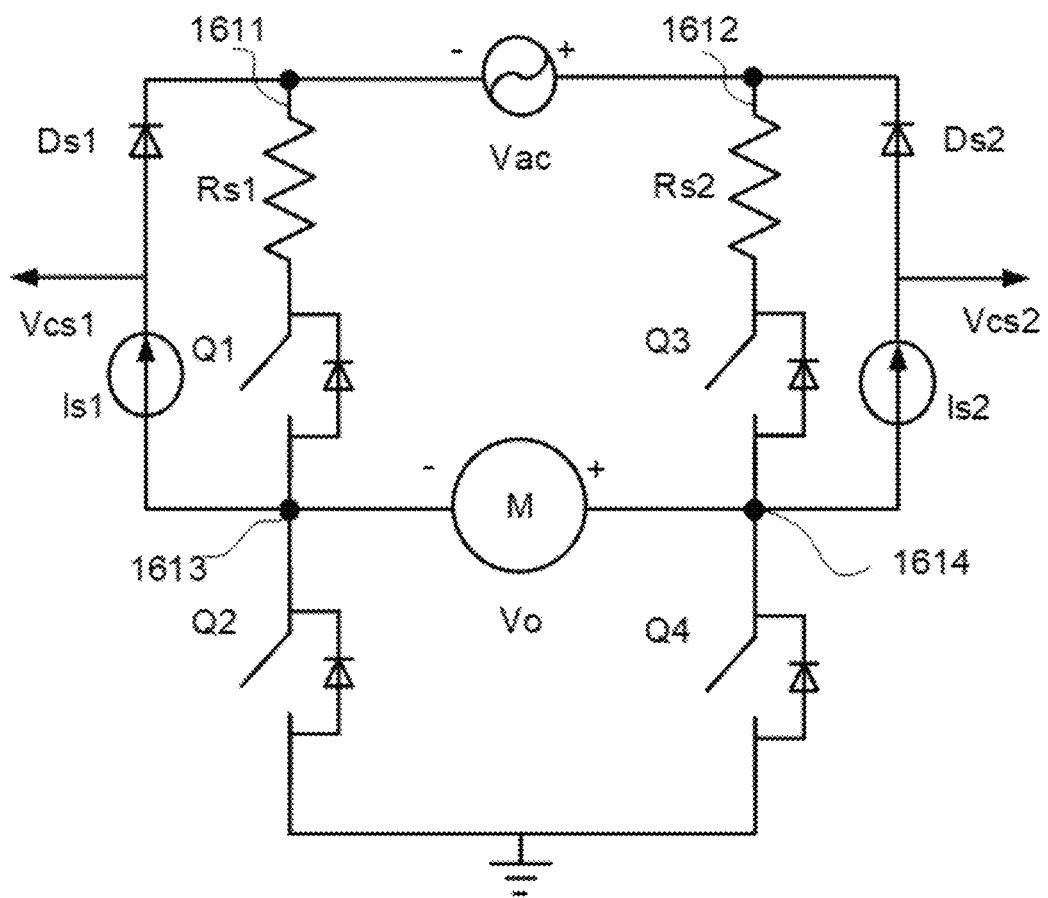
FIG. 16 illustrates a schematic diagram of an AC chopping circuit according to certain embodiments of the present disclosure.

FIG. 16 illustrates a schematic diagram of an AC chopping circuit according to certain embodiments of the present disclosure, wherein a current sensing circuit comprises a first sensing circuit and a second sensing circuit. The first sensing circuit comprises: a first sensing resistor Rs1 connected in series with a first switching transistor Q1; a first diode Ds1, a cathode of which is coupled to a first input terminal 1611 of a switching circuit; and a first current source Is1, an input of which is coupled to a first output terminal 1613 of the switching circuit and an output of which is coupled to an anode of the first diode Ds1 for providing a bias power source and providing a first current sensing signal Vcs1.

The second sensing circuit comprises a second sensing resistor Rs2 connected in series with a third switching transistor Q3; a second diode Ds2, a cathode of which is coupled to a second input terminal 1612 of the switching circuit; and a second current source Is2, an input of which is coupled to a second output terminal 1614 of the switching circuit and an output of which is coupled to an anode of the second diode Ds2 for providing a bias power source and a second current sensing signal Vcs2, wherein the current sensing circuit generates current sensing signals based on the first current sensing signal Vcs1 and the second current sensing signal Vcs2.

When the switch operates in a positive half cycle working zone, the switching transistors Q1 and Q2 are turned on, the Q3 operates in a switching state, the Q4 operates in a freewheeling state, and the two switching transistors of the left half bridge arm are turned on simultaneously; when the Q3 is turned on, the diode Ds2 is turned on in a positive bias mode, voltage drop of the output current across the Rs2 will be indicated by the Vcs2 signal; when the Q3 is turned off, the Ds2 is cut off in a reverse direction, and the signal Vcs2 is clamped to a certain voltage.

Similarly, when the switch operates in a negative half-cycle operation region, the two switching transistors of the right half bridge arm are turned on simultaneously; when the Q1 is turned on, the diode Ds1 is turned on in a positive bias mode, and voltage drop of the current across the Rs1 will be indicated by the Vcs1 signal. In one example, the first sensing resistor Rs1 indicates a on channel resistor of the first switching transistor Q1, the second sensing resistor Rs2 indicates a on channel resistor of the third switching transistor Q3, and the current sensing circuit does not include the discrete first and second sensing resistors.

Figure 17:
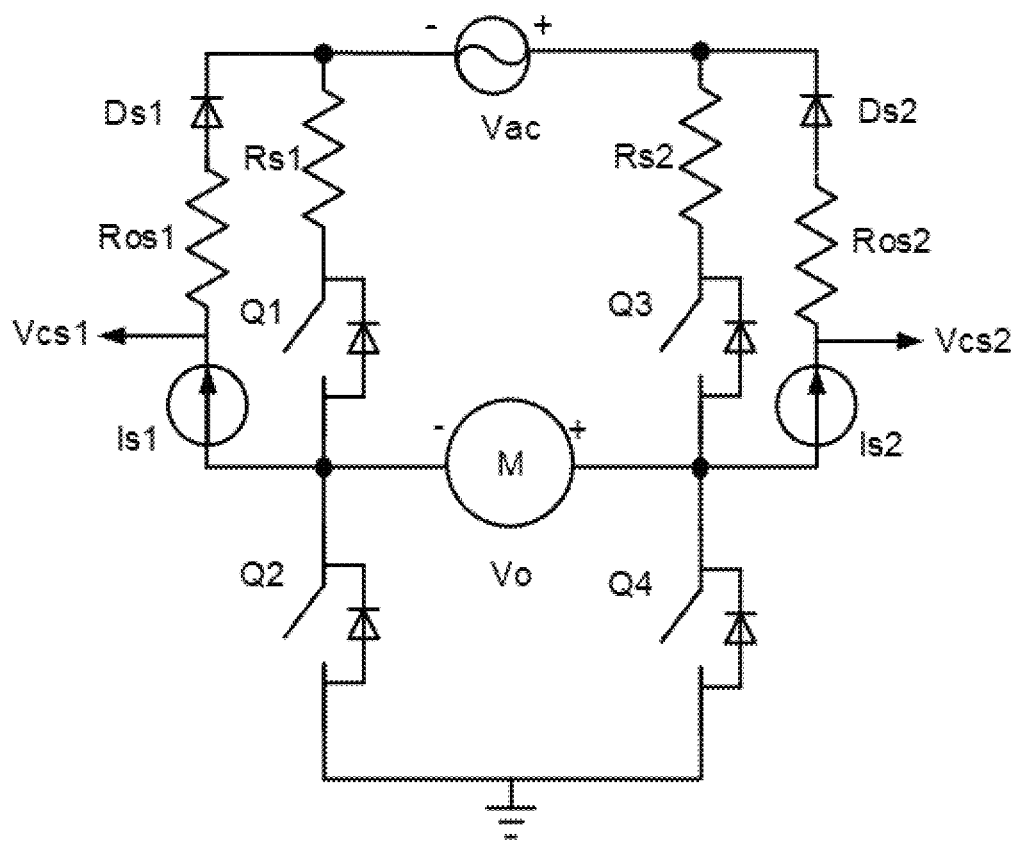
FIG. 17 illustrates a schematic diagram of an AC chopping circuit according to certain embodiments of the present disclosure.

FIG. 17 illustrates a schematic diagram of an AC chopping circuit according to certain embodiments of the present disclosure. Compared with the example in FIG. 16, in this example, the first current sensing circuit further comprises a first bias resistor Ros1, a first end of which is coupled to an output of a first current source Is1, and a second end of which is coupled to an anode of a first diode Ds1; the second current sensing circuit further comprises a second bias resistor Ros2, a first end of which is coupled to an output of a second current source Is2, and a second end of which is coupled to an anode of a second diode Ds2. By adjusting resistance values of the first bias resistor Ros1 and the second bias resistor Ros2, the overcurrent protection threshold can be adjusted.

Figure 18:
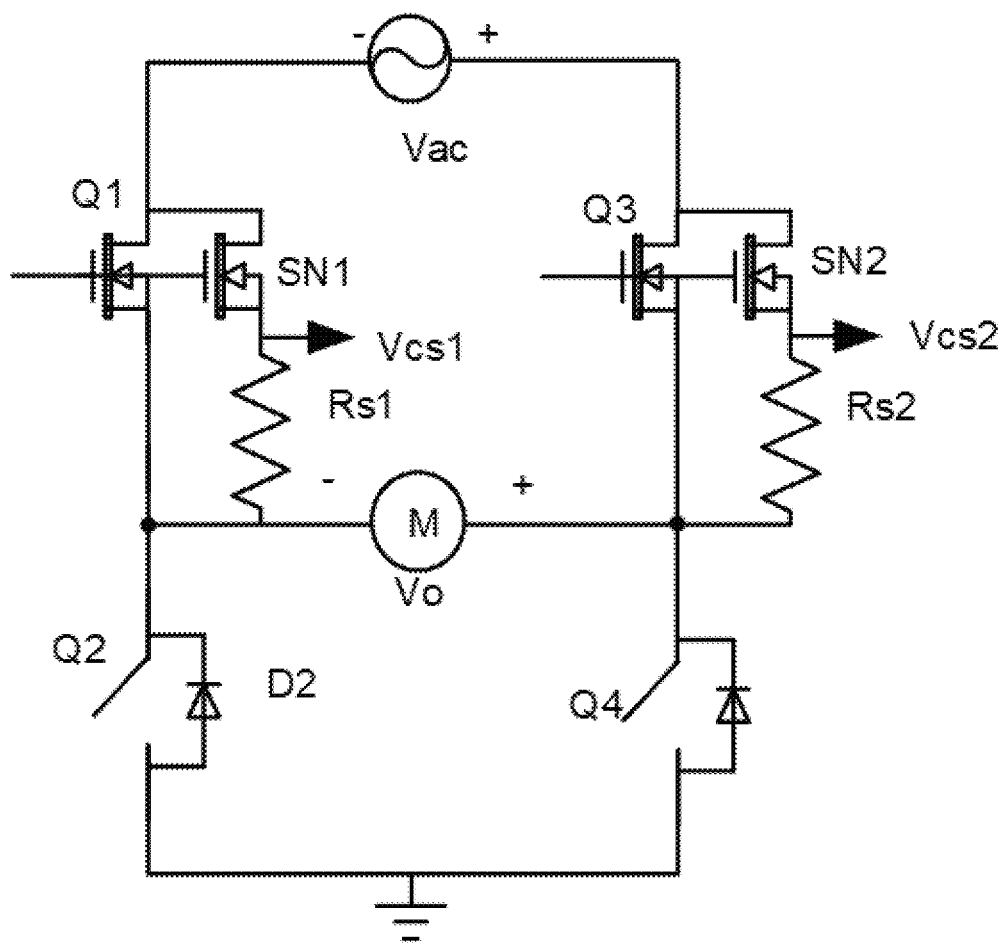
FIG. 18 illustrates a schematic diagram of an AC chopping circuit according to certain embodiments of the present disclosure.

FIG. 18 illustrates a schematic diagram of an AC chopping circuit according to certain embodiments of the present disclosure. In the AC chopping circuit, a current sensing circuit comprises a first sensing circuit and a second sensing circuit, wherein the first sensing circuit is connected in parallel with the first switching transistor Q1, and the first sensing circuit comprises a first transistor SN1 and a first sensing resistor Rs1 connected in series, wherein a control end of the first transistor SN1 is coupled to a control end of the first switching transistor Q1, and a coupling point of the first transistor SN1 and the first sensing resistor Rs1 provides a first sensing current signal Vcs1. The second sensing circuit is connected in parallel with a third switching transistor Q3, and the second sensing circuit comprises a second transistor SN2 and a second sensing resistor Rs2 connected in series, wherein a control end of the second transistor SN2 is coupled to a control end of the third switching transistor Q3, and a coupling point of the second transistor SN2 and the second sensing resistor Rs2 provides a second sensing current signal Vcs2.

According to certain embodiments, the first transistor SN1 can be integrated on the same semiconductor die as the first switching transistor Q1, and the second transistor SN2 can be integrated on the same semiconductor die as the third switching transistor Q3. In the illustrated example, the switching transistors Q1 and Q3 and the sensing transistors SN1 and SN2 are MOSFETs, and the current flowing through a load M and the current flowing through the sensing transistors are in a fixed ratio as a result of the connection described above. Therefore, the sensing signal Vcs2 obtained when Q3 is turned on or the sensing signal Vcs1 obtained when Q1 is turned on can be used to provide a current sensing signal. High consistency and more accurate sensing of current are achieved due to the application of the same semiconductor process. In the positive half cycle working zone, the current present when the Q3 is turned on indicates the voltage drop across the second sensing resistor Rs2 with the signal Vcs2. In the negative half-cycle operation region, the current present when the Q1 is turned on indicates the voltage drop across the first sensing resistor Rs1 with the signal Vcs1.

In one example, the first sensing circuit may be the first sensing circuit shown in FIG. 16 or FIG. 17, and the second sensing circuit may be the second sensing circuit shown in FIG. 18, and vice versa.

Figure 19:
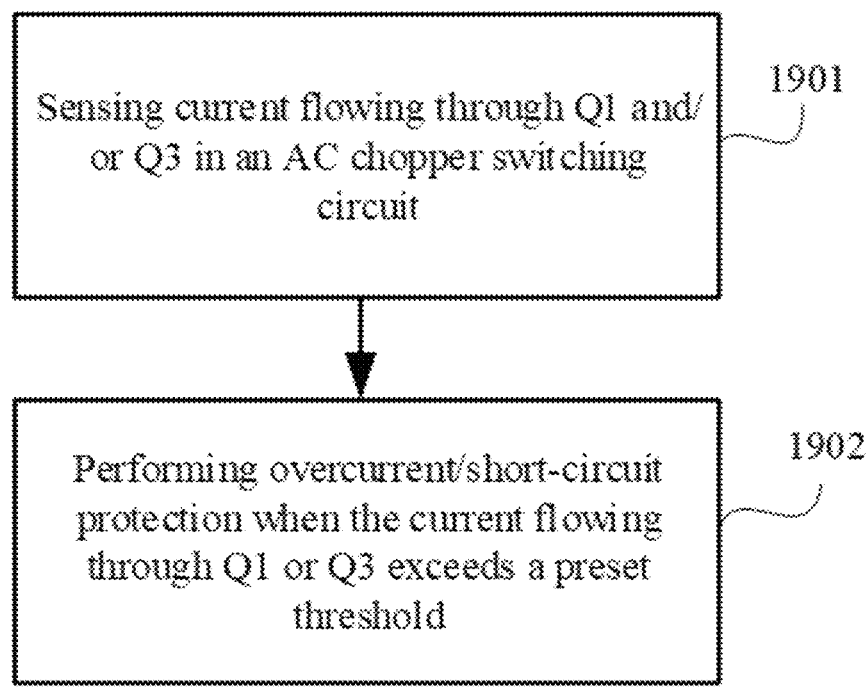
FIG. 19 illustrates a schematic flowchart of an overcurrent protection method according to certain embodiments of the present disclosure.

FIG. 19 illustrates a schematic flowchart of an overcurrent protection method according to certain embodiments of the present disclosure. The overcurrent protection method comprises detecting, at step 1901, current flowing through the first switching transistor Q1 and/or the third switching transistor Q3 in the AC chopping circuit shown in FIG. 18. The current sensing method may be implemented by the current sensing circuits in FIGS. 10-18 and their corresponding methods. The overcurrent protection method comprises, at step 1902, performing overcurrent/short-circuit protection when detecting that current flowing through the first switching transistor or the third switching transistor is in overcurrent state.

The overcurrent state can be represented by the fact that the current flowing through the first switching transistor or the current flowing through the third switching transistor is greater than a preset threshold, and it can also be judged according to specific working requirements or other conditions. Specifically, the current sensing signal may be compared with a set current threshold signal by a comparison circuit to generate an overcurrent/short-circuit indication signal. When the overcurrent/short-circuit indication signal indicates that the current is in overcurrent state, the switching circuit is controlled to execute overcurrent or short-circuit protection action. Two examples of overcurrent or short-circuit protection methods are described below.

Figure 20:
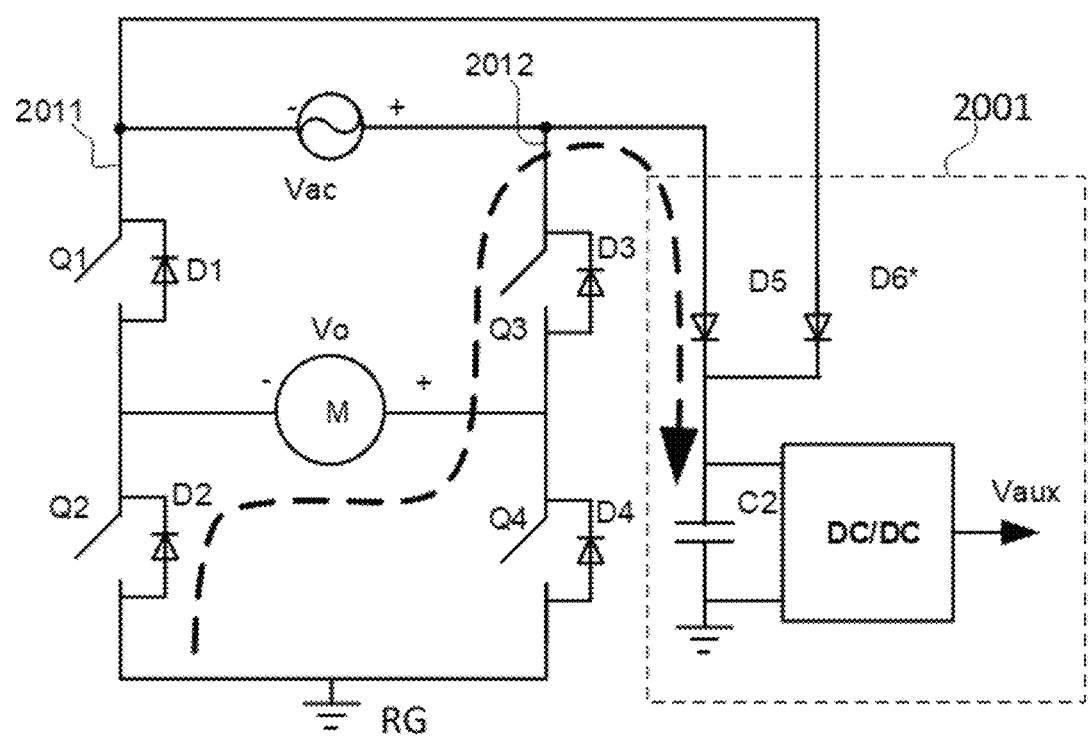
FIG. 20 illustrates a schematic diagram of an overcurrent protection method according to certain embodiments of the present disclosure.

FIG. 20 illustrates a schematic diagram of an overcurrent protection method according to certain embodiments of the present disclosure. The AC chopping circuit comprises an auxiliary power circuit 2001. An input of the auxiliary power circuit is coupled to a first input terminal 2011 and a second input terminal 2012 of a switching circuit, a reference ground end of the auxiliary power circuit 2001 is coupled to a reference terminal RG of the switching circuit, and an output of the auxiliary power circuit 2001 provides auxiliary power Vaux for supplying power to other circuits such as a control circuit.

In the AC chopping circuit, when an overcurrent/short-circuit indication signal indicates that the current is in overcurrent state, an overcurrent protection circuit controls the switching circuit to perform protection actions, including controlling the first switching transistor Q1, the second switching transistor Q2, the third switching transistor Q3 and the fourth switching transistor Q4 to be turned off simultaneously. At this time, the residual current of an inductive load M forces body diodes corresponding to the switching circuit to be turned on and form a current path with the auxiliary power circuit 2001 through the reference terminal RG, so as to provide a freewheeling path for the inductive load, and avoid over-voltage damage of the switching transistors caused by over-high voltage leap while providing overcurrent protection.

As shown in FIG. 20, when the operation is in the negative half cycle working zone, a current sensing circuit senses overcurrent, and the Q1-Q4 are turned off simultaneously. At this time, current flowing through the inductive load M provides a freewheeling path through a body diode D3 of the switching transistor Q3, diodes D5 and C2 in the auxiliary power circuit, the reference terminal RG, and a body diode D2 of the switching transistor Q2. Residual inductive energy is absorbed by a second capacitor C2 in the auxiliary power circuit 2001. The voltage of the switching transistor is also clamped by the capacitor C2 to prevent its over-voltage. It is noted that in this case, the results would be the same whether an on signal or an off signal is sent to the third switch and the second switch.

In FIG. 20, the auxiliary power circuit 2001 comprises the diode D5, a diode D6, the capacitor C2, and a DC/DC conversion circuit, wherein an anode of the diode D6 is coupled to the first input terminal 2011 of the switching circuit, and a cathode thereof is coupled to an input of the DC/DC circuit; an anode of the diode D5 is coupled to the second input terminal 2012 of the switching circuit, and a cathode thereof is coupled to the input of the DC/DC circuit; a ground end of the DC/DC is coupled to the reference terminal RG of the switching circuit and serves as a system ground, and an output of the DC/DC circuit provides the auxiliary power Vaux. The capacitor C2 is coupled between the input and the ground end of the DC/DC circuit.

When the switching circuit operates in the positive half cycle working zone, the Q1 and Q2 are turned on to couple the reference ground of the auxiliary power circuit 2001 to a low-voltage end of an AC power source, and the diode D5 is turned on to apply a high-voltage end of the AC power source Vac to the DC/DC circuit of the auxiliary power circuit. When the switching circuit operates in the negative half cycle working zone, the Q3 and Q4 are turned on to couple the reference ground of the auxiliary power circuit 2001 to a low-voltage end of an AC power source, and the diode D6 is turned on to apply a high-voltage end of the AC power source Vac to the DC/DC circuit of the auxiliary power circuit.

Figure 21:
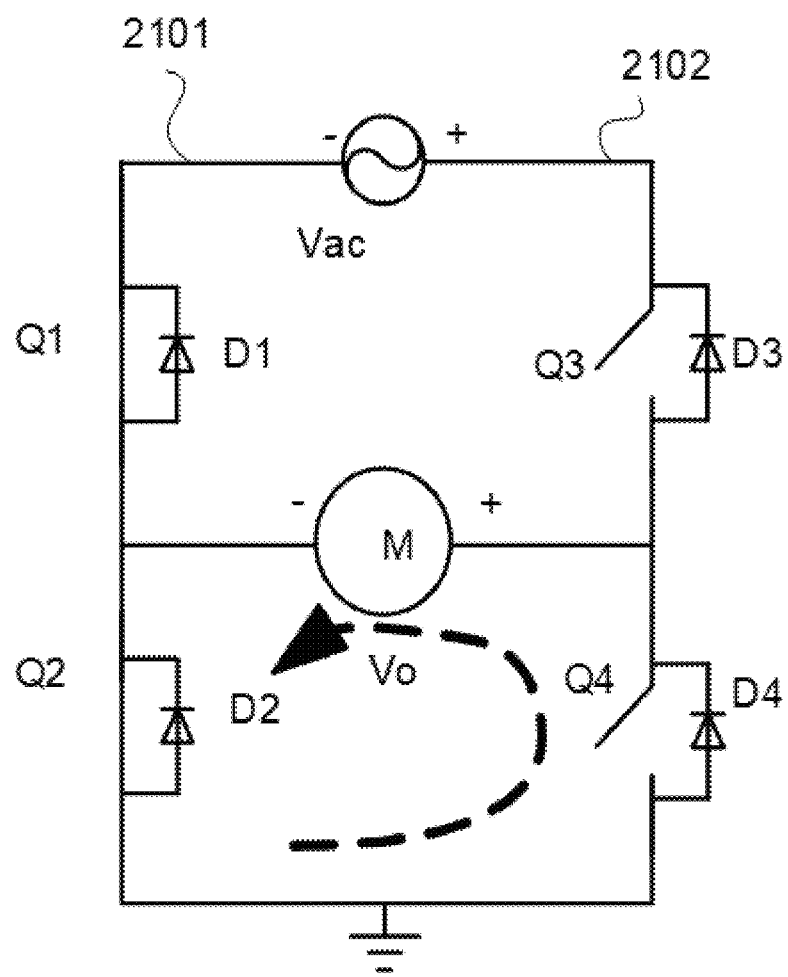
FIG. 21 illustrates a schematic diagram of an overcurrent protection method according to certain embodiments of the present disclosure.

FIG. 21 illustrates a schematic diagram of an overcurrent protection method according to certain embodiments of the present disclosure. In the overcurrent protection method shown in FIG. 20, when the operation is in the negative half cycle working zone and the voltage value is the maximum, voltage difference of the first switching transistor Q1 is the maximum, which is the sum of absolute values of the voltage of the clamping capacitor C2 and the voltage of the AC power source Vac. To solve this problem, in one example, the load, the second switching transistor and the fourth switching transistor form a freewheeling circuit when the overcurrent/short-circuit indication signal indicates that the current is in overcurrent state.

Referring to FIG. 21, when the overcurrent/short-circuit indication signal indicates that the current is in overcurrent state, the first switching transistor Q1 and the third switching transistor Q3 of the switching circuit are controlled to be turned off, and the second switching transistor Q2 and the fourth switching transistor Q4 are controlled to be turned on, such that the residual current flowing through the inductive load forms a loop through one turned-on lower switch and the body diode of the other lower switch. The second switching transistor Q2 or the fourth switching transistor Q4 may also operate in the non-synchronous freewheeling state.

FIG. 21 shows that in the positive half cycle working zone, that is when the voltage of a first input terminal 2101 of the switching circuit is smaller than that of a second input terminal 2102, a switch control circuit controls the second switching transistor Q2 to be turned on and the first switching transistor Q1 and the third switching transistor Q3 to be turned off when it is sensed that the current flowing through the switching transistor Q1 exceeds a preset threshold. In another example, the first switching transistor Q1 and the second switching transistor Q2 of a first bridge arm are turned on simultaneously, and the third switching transistor Q3 and the fourth switching transistor Q4 of a second bridge arm are turned off simultaneously.

At this time, the power source Vac stops supplying power to the load M, and as shown in the figure, the residual current in the inductive load M forms a freewheeling circuit through the turned-on second switching transistor Q2 and the body diode D4 of the fourth switching transistor Q4, so as to prevent the switching transistors from being damaged due to voltage leap. By this time, the residual inductive current is consumed by the loop resistor, and the voltage across the third switching transistor Q3 is clamped to the voltage of input AC power source Vac.

In the negative half cycle working zone, the voltage of the first input terminal 2101 is greater than that of the second input terminal 2102, and the switch control circuit controls the fourth switching transistor Q4 to be turned on and the rest switching transistors to be turned off. In another example, the first switching transistor Q1 and the second switching transistor Q2 of the first bridge arm may also be turned off, and the third switching transistor Q3 and the fourth switching transistor Q4 of the second bridge arm may also be turned on, such that the residual current forms a freewheeling circuit through the turned-on Q4 and the body diode D2, and the voltage of the first switching transistor Q3 is clamped to the voltage of input AC power source Vac.

Compared with the overcurrent protection mode shown in FIG. 20, the overcurrent protection measure of this example can enable lower voltage difference for the device.

In one example, in the overcurrent protection mode shown in FIG. 21, the turn-off duration Toff of the third switching transistor Q3 in the positive half cycle working zone and the first switching transistor Q1 in the negative half cycle working zone may be maintained for a period of time until the system is restarted. In one example, the turn-off duration Toff may also last several pulse width modulation periods. In another embodiment, when the overcurrent is sensed, the corresponding Q3 or Q1 is turned off, but in the next pulse width modulation period, the switching transistor Q3 (positive half cycle working zone) or the switching transistor Q1 (negative half cycle working zone) is again turned on normally, so that the overcurrent protection can be seamlessly switched with the normal operation mode, and thus the cycle-by-cycle control of the overcurrent protection is realized.

Figure 22:
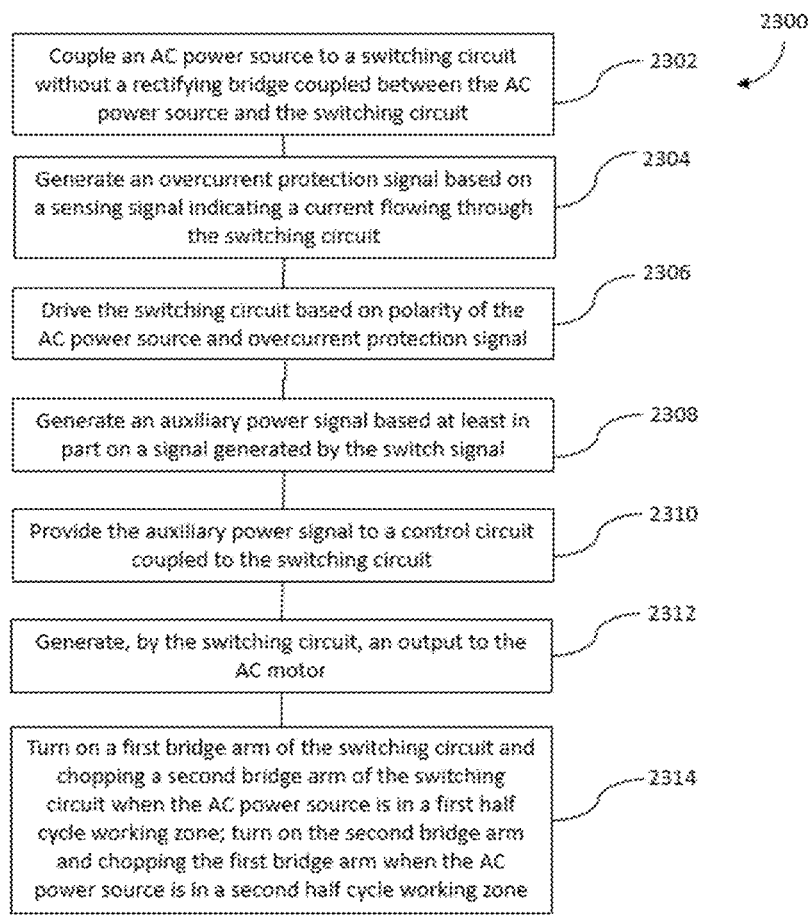
FIG. 22 is flow chart diagram illustrating a method for driving an AC motor, in accordance with embodiments of the subject matter of the disclosure.

FIG. 22 is flow chart diagram illustrating a method 2300 for driving an AC motor, in accordance with embodiments of the subject matter of the disclosure. One or more steps of method 2300 are optional and/or can be modified by one or more steps of other embodiments described herein. Additionally, one or more steps of other embodiments described herein may be added to the method.

At 2302, the method 2300 may include coupling an AC power source to a switching circuit without a rectifying bridge coupled between the AC power source and the switching circuit. At 2304, the method 2300 may include generating an overcurrent protection signal based on a sensing signal indicating a current flowing through a terminal of the switching circuit. At 2306, the method 2300 may include driving the switching circuit based on polarity of the AC power source and the overcurrent protection signal.

At 2308, the method 2300 may include generating an auxiliary power signal based at least in part on a signal generated by the switch signal. At 2310, the method 2300 may include providing the auxiliary power signal to a control circuit coupled to the switching circuit. At 2312, the method 2300 may include generating, by the switching circuit, an output to the AC motor. In some instances, the switching circuit is coupled to a capacitor. In some instances, the switching circuit is disposed in an integrated packaged device.

In some embodiments, for example at 2314, the method 2300 may further comprise turning on a first bridge arm of the switching circuit and chopping a second bridge arm of the switching circuit when the AC power source is in a first half cycle working zone, wherein the first bridge arm is coupled between a first terminal of the AC power source and a reference terminal of the switching circuit, wherein the second bridge arm is coupled between a second terminal of the AC power source and the reference terminal of the switching circuit, and turning on the second bridge arm and chopping the first bridge arm when the AC power source is in a second half cycle working zone.

According to an example, an alternating current (AC) chopping circuit comprises a switching circuit, a synchronizing signal generating circuit, a switch driving circuit, and an auxiliary power supplying circuit. In some instances, the switching circuit comprises a first input, a second input, a first output and a second output, wherein the first input is coupled to a first terminal of an AC power source, the second input is coupled to a second terminal of the AC power source, the first output is coupled to a first terminal of a load, and the second output is coupled to a second terminal of the load. In some instances, the synchronizing signal generating circuit is configured to provide a synchronizing signal associated with a polarity of the AC power source. In some instances, the switch driving circuit is configured to control the switching circuit based at least in part upon the synchronizing signal. In some instances, the auxiliary power supplying circuit is coupled to the switching circuit, and the auxiliary power supplying circuit generates an auxiliary power coupled to the switch driving circuit based on a voltage signal generated by the switching circuit.

In some instances, the switching circuit has a reference terminal coupled to the auxiliary power supplying circuit and the switch driving circuit, and the reference terminal functions as a ground of the auxiliary power supplying circuit and a ground of the switch driving circuit.

In some instances, the AC chopping circuit may further comprise a first capacitor coupled between the first input and the second input of the switching circuit, wherein the switching circuit is disposed in an integrated packaged device.

In some instances, the switching circuit comprises a first switching transistor coupled between the first input and the first output of the switching circuit, a second switching transistor coupled between a reference terminal and the first output of the switching circuit, a third switching transistor coupled between the second input and the second output of the switching circuit, and a fourth switching transistor coupled between the reference terminal and the second output of the switching circuit.

In some instances, the switch driving circuit comprises a first half-bridge driving circuit configured to drive the first switching transistor and the second switching transistor, wherein the first half-bridge driving circuit is configured to turn on the first switching transistor and the second switching transistor simultaneously; and a second half-bridge driving circuit configured to drive the third switching transistor and the fourth switching transistor, wherein the second half-bridge driving circuit is configured to turn on the third switching transistor and the fourth switching transistor simultaneously. In some embodiments, the first half-bridge driving circuit selectively disables a first conduction interlock circuit in the first half-bridge driving circuit based on the synchronizing signal, and the second half-bridge driving circuit selectively disables a second conduction interlock circuit in the second half-bridge driving circuit based on the synchronizing signal.

In some instances, the first switching transistor has a first body diode coupled in parallel with the first switching transistor, and wherein anode of the first body diode is coupled to the first output of the switching circuit, and cathode of the first body diode is coupled to the first input of the switching circuit; the second switching transistor has a second body diode coupled in parallel with the second switching transistor, and wherein anode of the second body diode is coupled to the reference terminal of the switching circuit, and cathode of the second body diode is coupled to the first output of the switching circuit; the third switching transistor comprises a third body diode coupled in parallel with the third switching transistor, and wherein anode of the third body diode is coupled to the second output of the switching circuit, and cathode of the third body diode is coupled to the second input of the switching circuit; and the fourth switching transistor comprises a fourth body diode coupled in parallel with the fourth switching transistor, and wherein anode of the fourth body diode is coupled to the reference terminal of the switching circuit, and cathode of the fourth body diode is coupled to the second output of the switching circuit.

In some instances, the auxiliary power supplying circuit has an input, an output and a reference terminal, and wherein the input of the auxiliary power supplying circuit is coupled to either one of the first input, the second input, the first output or the second output of the switching circuit, the output of the auxiliary power supplying circuit is coupled to the switch driving circuit and/or the synchronizing signal generating circuit configured to provide power to the switch driving circuit and/or the synchronizing signal generating circuit, and the reference terminal of the auxiliary power supplying circuit is coupled to the reference terminal of the switching circuit configured to form a current loop among the input of the auxiliary power supplying circuit, the reference terminal of the auxiliary power supplying circuit and the switching circuit.

In some instances, the auxiliary power supplying circuit further comprises a fifth diode having an anode coupled to the second input of the switching circuit, and/or a sixth diode having an anode coupled to the first input of the switching circuit, and a voltage converting circuit having a first input, a second input and an output, wherein the first input of the voltage converting circuit is coupled to a cathode of the fifth diode and/or a cathode of the sixth diode, the second input of the voltage converting circuit is coupled to the reference terminal of the switching circuit, and the output of the auxiliary power supplying circuit is configured to provide the auxiliary power.

In some instances, the auxiliary power supplying circuit further comprises a seventh diode having an anode coupled to the second input of the voltage converting circuit and a cathode coupled to the anode of the fifth diode, and/or an eighth diode having an anode coupled to the second input of the voltage converting circuit and a cathode coupled to the anode of the sixth diode.

In some instances, the auxiliary power supplying circuit comprises a first resistor having a first terminal coupled to the first input of the switching circuit, a second resistor having a first terminal coupled to the second input of the switching circuit, and a second terminal coupled to a second terminal of the first resistor, and a voltage converting circuit having a first input, a second input and an output, wherein the first input of the voltage converting circuit is coupled to the second terminal of the first resistor, the second input of the voltage converting circuit is coupled to the reference terminal of the switching circuit, and the output of the voltage converting circuit is configured to provide an auxiliary power.

In some instances, when the voltage at the first input of the switching circuit is less than the voltage at the second input of the switching circuit, the synchronizing signal indicates a positive half cycle working zone, and the switch driving circuit turns on the first switching transistor and the second switching transistor, controls the third switching transistor performing switching action with a duty cycle and controls the fourth switching transistor working at rectification state. In some instances, when the voltage at the first input of the switching circuit is higher than the voltage at the second input of the switching circuit, the synchronizing signal indicates a negative half cycle working zone, the switch driving circuit turns on the third switching transistor and the fourth switching transistor, controls the first switching transistor performing switching action with a duty cycle and controls the second switching transistor working at rectification state.

In some instances, when the synchronizing signal indicates a dead zone between the positive half cycle working zone and the negative half cycle working zone, the switch driving circuit controls at least two switching transistors among the first switching transistor, the second switching transistor, the third switching transistor and the fourth switching transistor to be off. In some instances, the switch driving circuit further controls one or two switching transistor among the first switching transistor, the second switching transistor, the third switching transistor and the fourth switching transistor to be on configured to provide a current loop for the load.

In some instances, during the dead zone, the switch driving circuit controls the first switching transistor and the third switching transistor to be on, and controls the second switching transistor and the fourth switching transistor to be off.

In other instances, during the dead zone, the switch driving circuit controls the second switching transistor and the fourth switching transistor to be on, and controls the first switching transistor and the third switching transistor to be off.

In some instances, the synchronizing signal generating circuit comprises a differential amplifying circuit configured to generate an AC signal with reference to the reference terminal of the switching circuit based on the AC power source, a first comparing circuit having a first input coupled to an output of the differential amplifying circuit, a second input configured to receive a first threshold signal, and an output configured to provide a first synchronizing signal, and a second comparing circuit having a first input coupled to the output of the differential amplifying circuit, a second input configured to receive a second threshold signal, and an output configured to provide a second synchronizing signal.

In some instances, the synchronizing signal includes a first synchronizing signal and a second synchronizing signal. In some instances, when the AC power source is higher than a first threshold signal, the first synchronizing signal is in a first state and the second synchronizing signal is in a second state; when the AC power source is lower a second threshold signal, the first synchronizing signal is in the second state and the second synchronizing signal is in the first state; and when the AC power source is lower than the first threshold signal and higher than the second threshold signal, the first synchronizing signal and the second synchronizing signal are set in the first state or the second state simultaneously, and wherein the first threshold signal is a positive voltage signal and the second threshold signal is a negative voltage signal.

In some instances, the auxiliary power supplying circuit has an input, an output and a reference terminal. The input of the auxiliary power supplying circuit is coupled to a first terminal of the switching circuit. The reference terminal of the auxiliary power supplying circuit is coupled to a second terminal of the switching circuit. The output of the auxiliary power supplying circuit supplies the switch driving circuit. In some instances, a current path forms between the second terminal and the first terminal of the switching circuit through at least a body diode of the switching circuit.

According to an example, a driving method for driving an AC motor comprises coupling an AC power source to a switching circuit without a rectifying bridge coupled between the AC power source and the switching circuit; driving the switching circuit based on a polarity of the AC power source; and providing an auxiliary power by coupling an input of an auxiliary power supplying circuit to the switching circuit and coupling a ground terminal of the auxiliary power supplying circuit to a reference terminal of the switching circuit.

In some instances, the driving method further comprises turning on a first bridge arm of the switching circuit and chopping a second bridge arm of the switching circuit in complementary pattern in a first half cycle working zone, wherein the first bridge arm is coupled between a first terminal of the AC power source and the reference terminal and the second bridge arm is coupled between a second terminal of the AC power source and the reference terminal; and turning on the second bridge arm and chopping the first bridge arm in complementary pattern when the AC power source is in a second half cycle working zone.

In some instances, the driving method further comprises forming a current loop through a first diode (D5) of the auxiliary power supplying circuit, the reference terminal and the switching circuit when the AC power source Vac is in the first half cycle working zone, wherein an anode of the first diode is coupled to the second terminal of the AC power source or a second output of the switching circuit; and forming a current loop through a second diode (D6) of the auxiliary power supplying circuit, the reference terminal and the switching circuit when the AC power source Vac in the second half cycle working zone, wherein the anode of the second diode is coupled to the first terminal of the AC power source or a first output of the switching circuit, and wherein the AC motor is coupled between the first output of the switching circuit and the second output of the switching circuit.

According to an example, a current sensing method for an AC chopping circuit, wherein the AC chopping circuit comprises a first switching transistor coupled between a first input and a first output; a second switching transistor coupled between a reference terminal and the first output; a third switching transistor coupled between a second input and a second output; and a fourth switching transistor coupled between the reference terminal and the second output. In some instances, the first input is coupled to a first end of an AC power source, the second input is coupled to a second end of the AC power source, the first output is coupled to a first end of a load, and the second output is coupled to a second end of the load. In some instances, the current sensing method comprises sensing current flowing through the first switching transistor and/or sensing current flowing through the third switching transistor.

In some instances, the current flowing through the first switching transistor is sensed by sensing voltage of the first input relative to the first output or the reference terminal, and/or the current flowing through a third switch is sensed by sensing voltage of the second input relative to the second output or the reference terminal.

In some instances, the current sensing method further comprises connecting a first sensing resistor with the first switching transistor in series; connecting a second sensing resistor with the third switching transistor in series; coupling a cathode of a first diode to the first input; coupling a cathode of a second diode to the second input; and coupling an output of a current source to an anode of the first diode and an anode of the second diode for providing a bias current, such that voltage at the output of the current source indicates load current.

In some instances, the current sensing method further comprises coupling a first end of a bias resistor to the output of the current source and coupling a second end of the bias resistor to the anode of the first diode and the anode of the second diode.

In some instances, the current sensing method further comprises sensing voltage at the first input based on an equivalent on-resistance of the first switching transistor; sensing voltage at the second input based on an equivalent on-resistance of the third switching transistor; coupling a cathode of a first diode to the first input; coupling a cathode of a second diode to the second input; and coupling an output of a current source to an anode of the first diode and an anode of the second diode for providing a bias current, such that voltage at the output of the current source indicates load current.

In some instances, the current sensing method further comprises coupling a first end of a bias resistor to the output of the current source and coupling a second end of the bias resistor to the anode of the first diode and the anode of the second diode.

In some instances, the current sensing method further comprises connecting a first sensing resistor with the first switching transistor in series; coupling a cathode of a first diode to the first input; coupling an input of a first current source to the first output and coupling an output of the first current source to an anode of the first diode for providing a bias current, such that voltage at the output of the first current source indicates the current flowing through the first switching transistor; connecting a second sensing resistor with the third switching transistor in series; coupling a cathode of a second diode to the second input; and coupling an input of a second current source to the second output and coupling an output of the second current source to an anode of the second diode for providing a bias current, such that voltage at the output of the second current source indicates the current flowing through the third switching transistor.

In some instances, the current sensing method further comprises providing a first bias resistor between the output of the first current source and the anode of the first diode for setting a reference threshold for current sensing; and providing a second bias resistor between the output of the second current source and the anode of the second diode for setting a reference threshold for current sensing.

In some instances, the first sensing resistor indicates an equivalent on-resistance of the first switching transistor, and the second sensing resistor indicates an equivalent on-resistance of the third switching transistor.

In some instances, the current sensing method further comprises connecting a first transistor and a first sensing resistor connected in series with the first switching transistor in parallel, wherein a control end of the first transistor is coupled to a control end of the first switching transistor, such that voltage drop at the first sensing resistor indicates the current flowing through the first switching transistor; and connecting a second transistor and a second sensing resistor connected in series with the third switching transistor in parallel, wherein a control end of the second transistor is coupled to a control end of the third switching transistor, such that voltage drop at the second sensing resistor indicates the current flowing through the third switching transistor.

In some instances, the current sensing method further comprises integrating the first transistor and the first switching transistor on the same semiconductor die, and integrating the second transistor and the third switching transistor on the same semiconductor die.

According to an example, an overcurrent protection method comprises the current sensing method and performs overcurrent/short-circuit protection when the current flowing through the first switching transistor or through the third switching transistor is in overcurrent state.

In some instances, the overcurrent protection method, wherein the AC chopping circuit further comprises an auxiliary power circuit, wherein an input of the auxiliary power circuit is coupled to the first input and the second input, a reference ground end of the auxiliary power circuit is coupled to the reference terminal, and an output of the auxiliary power circuit provides auxiliary power; the overcurrent protection method comprises turning off the first switching transistor, the second switching transistor, the third switching transistor and the fourth switching transistor simultaneously when the current flowing through the first switching transistor or through the third switching transistor is greater than a preset threshold.

In some instances, the overcurrent protection method comprises controlling the load, the second switching transistor and the fourth switching transistor to form a freewheeling loop when the current flowing through the first switching transistor or through the third switching transistor is greater than a preset threshold.

In some instances, the overcurrent protection method, wherein the first switching transistor and the third switching transistor are turned off and the second switching transistor and the fourth switching transistor are turned on when the current flowing through the first switching transistor or through the third switching transistor is greater than the preset threshold.

Here, the description and application of the invention are illustrative, and it is not intended to limit the scope of the invention to the above embodiments. The effects or advantages and other related descriptions mentioned in the specification may not be reflected in the actual experimental examples due to the uncertainty of variable condition parameters or other factors not mentioned. The effects or advantages and other related descriptions are not used to limit the scope of the invention. It is possible to modify the embodiments disclosed herein, and the replacement and equivalent components of the embodiments are well known to those skilled in the art. It should be clear to those skilled in the art that the invention can be realized in other forms, structures, arrangements, proportions and with other components, materials and components without departing from the spirit or essential features of the invention. Other modifications and changes can be made to the embodiments disclosed herein without departing from the scope and spirit of the invention.

It should be understood that the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Various modifications and additions can be made to the exemplary embodiments discussed without departing from the scope of the presently disclosed subject matter. For example, while the embodiments described above refer to particular features, the scope of this disclosure also includes embodiments having different combinations of features and embodiments that do not include all of the described features. Accordingly, the scope of the subject matter disclosed herein is intended to embrace all such alternatives, modifications, and variations as fall within the scope of the claims, together with all equivalents thereof.

We claim:

1. An alternating current (AC) chopping circuit, comprising:
    a switching circuit comprising a first input terminal, a second input terminal, a first output terminal and a second output terminal, wherein the first input terminal is coupled to a first terminal of an AC power source, the second input terminal is coupled to a second terminal of the AC power source, the first output terminal is coupled to a first terminal of a load, and the second output terminal is coupled to a second terminal of the load;
    a synchronizing signal generating circuit configured to generate a synchronizing signal associated with a polarity of the AC power source;
    a switch driving circuit configured to control the switching circuit based at least in part upon the synchronizing signal; and
    an auxiliary power supplying circuit coupled to the switching circuit, the auxiliary power supplying circuit generating an auxiliary power signal coupled to the switch driving circuit based at least in part on a voltage signal generated by the switching circuit.

2. The AC chopping circuit of claim 1, wherein the switching circuit has a reference terminal coupled to the auxiliary power supplying circuit and the switch driving circuit.

3. The AC chopping circuit of claim 2, wherein the switching circuit comprises:
a first switching transistor coupled between the first input terminal and the first output terminal of the switching circuit;
a second switching transistor coupled between a reference terminal and the first output terminal of the switching circuit;
a third switching transistor coupled between the second input terminal and the second output terminal of the switching circuit; and
a fourth switching transistor coupled between the reference terminal and the second output terminal of the switching circuit.

4. The AC chopping circuit of claim 3, wherein the switch driving circuit comprises:
a first half-bridge driving circuit configured to drive the first switching transistor and the second switching transistor, wherein the first half-bridge driving circuit is configured to turn on the first switching transistor and the second switching transistor simultaneously; and
a second half-bridge driving circuit configured to drive the third switching transistor and the fourth switching transistor, wherein the second half-bridge driving circuit is configured to turn on the third switching transistor and the fourth switching transistor simultaneously; wherein
the first half-bridge driving circuit is configured to selectively disable a first conduction interlock circuit in the first half-bridge driving circuit based on the synchronizing signal, and the second half-bridge driving circuit is configured to selectively disable a second conduction interlock circuit in the second half-bridge driving circuit based on the synchronizing signal.

5. The AC chopping circuit of claim 3, wherein:
the first switching transistor includes a first body diode coupled in parallel with a first transistor, wherein an anode of the first body diode is coupled to the first output terminal of the switching circuit, and a cathode of the first body diode is coupled to the first input terminal of the switching circuit;
the second switching transistor includes a second body diode coupled in parallel with a second transistor, wherein an anode of the second body diode is coupled to the reference terminal of the switching circuit, and a cathode of the second body diode is coupled to the first output terminal of the switching circuit;
the third switching transistor comprises a third body diode coupled in parallel with a third transistor, wherein an anode of the third body diode is coupled to the second output terminal of the switching circuit, and a cathode of the third body diode is coupled to the second input terminal of the switching circuit; and
the fourth switching transistor comprises a fourth body diode coupled in parallel with a fourth transistor, wherein the anode of the fourth body diode is coupled to the reference terminal of the switching circuit, and a cathode of the fourth body diode is coupled to the second output terminal of the switching circuit.

6. The AC chopping circuit of claim 3, wherein the auxiliary power supplying circuit includes an input terminal, an output terminal and a reference terminal, wherein the input terminal of the auxiliary power supplying circuit is coupled to at least one of the first input terminal and the second input terminal of the switching circuit, the output terminal of the auxiliary power supplying circuit is coupled to the switch driving circuit or the synchronizing signal generating circuit, and the reference terminal of the auxiliary power supplying circuit is coupled to the reference terminal of the switching circuit configured to form a current loop.

7. The AC chopping circuit of claim 3, wherein the auxiliary power supplying circuit comprises:
a fifth diode having an anode coupled to the second input terminal of the switching circuit, a sixth diode having an anode coupled to the first input terminal of the switching circuit; and
a voltage converting circuit having a first input terminal, a second input terminal and an output terminal, wherein the first input terminal of the voltage converting circuit is coupled to a cathode of the fifth diode or a cathode of the sixth diode, the second input terminal of the voltage converting circuit is coupled to the reference terminal of the switching circuit, and the output terminal of the voltage converting circuit configured to output the auxiliary power signal.

8. The AC chopping circuit of claim 7, wherein the auxiliary power supplying circuit further comprises:
a seventh diode having an anode coupled to the second input terminal of the voltage converting circuit and a cathode coupled to the anode of the fifth diode; and
an eighth diode having an anode coupled to the second input terminal of the voltage converting circuit and a cathode coupled to the anode of the sixth diode.

9. The AC chopping circuit of claim 3, wherein the auxiliary power supplying circuit comprises:
a first resistor having a first terminal coupled to the first input of the switching circuit;
a second resistor having a first terminal coupled to the second input of the switching circuit, and a second terminal coupled to a second terminal of the first resistor; and
a voltage converting circuit having a first input, a second input and an output, wherein the first input of the voltage converting circuit is coupled to the second terminal of the first resistor, the second input of the voltage converting circuit is coupled to the reference terminal of the switching circuit, and the output of the voltage converting circuit is configured to provide an auxiliary power.

10. The AC chopping circuit of claim 3, wherein:
when a voltage at the first input terminal of the switching circuit is less than a voltage at the second input of the switching circuit, the synchronizing signal indicates a positive half cycle working zone, and the switch driving circuit is configured to:
turn on the first switching transistor and the second switching transistor;
control the third switching transistor performing a switching action with a duty cycle; and
control the fourth switching transistor working at a rectification state; and
when the voltage at the first input terminal of the switching circuit is higher than the voltage at the second input terminal of the switching circuit, the synchronizing signal indicates a negative half cycle working zone, the switch driving circuit is configured to:
turn on the third switching transistor and the fourth switching transistor;
control the first switching transistor performing a switching action with a duty cycle; and
control the second switching transistor working at a rectification state.

11. The AC chopping circuit of claim 10, wherein:
when the synchronizing signal indicates a dead zone between the positive half cycle working zone and the negative half cycle working zone, the switch driving circuit is configured to:
set at least two switching transistors to be off, the at least two switching transistors selected from a group consisting of the first switching transistor, the second switching transistor, the third switching transistor and the fourth switching transistor; and
set one or two switching transistors to be on, the one or two switching transistors selected from a group consisting of the first switching transistor, the second switching transistor, the third switching transistor and the fourth switching transistor.

12. The AC chopping circuit of claim 11, wherein during the dead zone, the switch driving circuit is configured to set the first switching transistor and the third switching transistor to be on, and set the second switching transistor and the fourth switching transistor to be off.

13. The AC chopping circuit of claim 11, wherein during the dead zone, the switch driving circuit is configured to set the second switching transistor and the fourth switching transistor to be on, and set the first switching transistor and the third switching transistor to be off.

14. The AC chopping circuit of claim 3, wherein the synchronizing signal generating circuit comprises:
a differential amplifying circuit configured to generate an AC signal with reference to the reference terminal of the switching circuit based on the AC power source;
a first comparing circuit having a first input coupled to an output of the differential amplifying circuit, a second input configured to receive a first threshold signal, and an output configured to provide a first synchronizing signal; and
a second comparing circuit having a first input coupled to the output of the differential amplifying circuit, a second input configured to receive a second threshold signal, and an output configured to provide a second synchronizing signal.

15. The AC chopping circuit of claim 1, further comprising a capacitor coupled between the first input terminal and the second input terminal of the switching circuit, wherein the switching circuit is disposed in an integrated packaged device.

16. The AC chopping circuit of claim 1, wherein the synchronizing signal includes a first synchronizing signal and a second synchronizing signal,
wherein:
when the AC power source is higher than a first threshold signal, the first synchronizing signal is set at a first state and the second synchronizing signal is set at a second state, the second state being different from the first state;
when the AC power source is lower a second threshold signal, the first synchronizing signal is set at the second state and the second synchronizing signal is set at the first state; and
when the AC power source is lower than the first threshold signal and higher than the second threshold signal, the first synchronizing signal and the second synchronizing signal are set at a same state selected from the first state and the second state,
wherein the first threshold signal is a positive voltage signal and the second threshold signal is a negative voltage signal.

17. The AC chopping circuit of claim 1, further comprising:
an overcurrent protection circuit configured to receive a first sensing signal indicating a first current flowing through the first input terminal and a second sensing signal indicating a second current flowing through the second input terminal, the overcurrent protection circuit configured to generate an overcurrent protection signal based at least in part on the first sensing signal and the second sensing signal.

18. A driving method for driving an AC motor, comprising:
coupling an AC power source to a switching circuit without a rectifying bridge coupled between the AC power source and the switching circuit;
driving the switching circuit based on a polarity of the AC power source;
generating an auxiliary power signal based at least in part on a signal generated by the switch signal;
providing the auxiliary power signal to a control circuit coupled to the switching circuit; and
generating, by the switching circuit, an output to the AC motor.

19. The driving method of claim 18, further comprising:
turning on a first bridge arm of the switching circuit and chopping a second bridge arm of the switching circuit when the AC power source is in a first half cycle working zone, wherein the first bridge arm is coupled between a first terminal of the AC power source and a reference terminal of the switching circuit, wherein the second bridge arm is coupled between a second terminal of the AC power source and the reference terminal of the switching circuit; and
turning on the second bridge arm and chopping the first bridge arm when the AC power source is in a second half cycle working zone.

20. The driving method of claim 18, wherein the switching circuit is coupled to a capacitor, wherein the switching circuit is disposed in an integrated packaged device.

* * * * *